(12) United States Patent
Waldern et al.

(10) Patent No.: US 6,407,724 B2
(45) Date of Patent: *Jun. 18, 2002

(54) METHOD OF AND APPARATUS FOR VIEWING AN IMAGE

(75) Inventors: Jonathan David Waldern, Palo Altos Hills, CA (US); Milan Momcilo Popovich, Leicester; John James Storey, Nottingham, both of (GB)

(73) Assignee: DigiLens, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,461

(22) Filed: Apr. 9, 1998

Related U.S. Application Data

(63) Continuation-in-part of application No. PCT/GB97/00711, filed on Mar. 14, 1997.

(51) Int. Cl.$^7$ .................................................. G02B 5/32
(52) U.S. Cl. ................................................. 345/8; 345/7
(58) Field of Search ......................................... 345/7, 8

(56) References Cited

U.S. PATENT DOCUMENTS

| | | |
|---|---|---|
| 3,807,829 A | 4/1974 | Close |
| 4,028,725 A | 6/1977 | Lewis ........................ 358/103 |
| 4,458,981 A | 7/1984 | Huignard |
| 4,500,163 A | 2/1985 | Burns et al. |
| 4,566,031 A | 1/1986 | Kirk |

(List continued on next page.)

FOREIGN PATENT DOCUMENTS

| | | | |
|---|---|---|---|
| DE | 34 19 098 A1 | 11/1985 | ........... G02B/27/22 |
| EP | 0 389 123 A2 | 9/1990 | ........... G03B/21/56 |

(List continued on next page.)

OTHER PUBLICATIONS

Bunning, T.J. et al., "The Morphology and Performance of Holographic Transmission Gratings Recorded in Polymer Dispersed Liquid Crystals," Polymer vol. 36, No. 14, received Dec. 27, 1994; revised Feb. 10, 1995, pp. 2699–2708.

Domash, Lawrence H. et al., "Applications of Switchable Polaroid Holograms," SPIE vol. 2152, Jun. 1, 1994, pp. 127–138.

(List continued on next page.)

*Primary Examiner*—Bipin Shalwala
*Assistant Examiner*—Vincent E. Kovalick
(74) *Attorney, Agent, or Firm*—Skjerven Morrill MacPherson LLP

(57) ABSTRACT

Light from an image displayed on a display screen 10 is transmitted to an observer's eye 11 by way of a dynamic optical element 12 (such as a spatial light modulator or an electrically switchable holographic composite) which acts as a lens. The characteristics of the dynamic optical element 12 can be altered so that it acts sequentially to direct light of different colors to the observer's eye.

In one optional embodiment emitters 17 on the display screen 10 emit infra-red radiation which is projected by the dynamic lens 12 as a broad wash onto the eye 11. Infra-red radiation reflected back from the eye 11 is focussed by the dynamic lens 12 onto detectors 18 also provided on the display screen 10. The detectors 18 are thus able to sense the direction of eye gaze, and the dynamic lens 12 is controlled in dependence on this to create an area of high resolution in an area of interest centered on the direction of gaze, which is moved to follow the eye gaze as its direction alters. Other than in the area of interest, the dynamic lens 12 has a relatively low resolution.

16 Claims, 24 Drawing Sheets

U.S. PATENT DOCUMENTS

| | | |
|---|---|---|
| 4,669,812 A | 6/1987 | Hoebing |
| 4,759,596 A | 7/1988 | Po et al. |
| 4,790,613 A | 12/1988 | Moss |
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |
| H738 H | 2/1990 | McManus et al. |
| 4,932,731 A | 6/1990 | Suzuki et al. |
| 4,938,568 A | 7/1990 | Margerum et al. ........... 350/334 |
| 4,981,332 A | 1/1991 | Smith et al. |
| 4,993,790 A | 2/1991 | Vick |
| 5,011,244 A | 4/1991 | Smith et al. |
| 5,013,141 A | 5/1991 | Sakata ........................ 350/348 |
| 5,014,709 A | 5/1991 | Bjelkhagen et al. |
| 5,024,494 A | 6/1991 | Williams et al. |
| 5,035,474 A | 7/1991 | Moss |
| 5,036,385 A | 7/1991 | Eichenlaub et al. |
| 5,044,709 A | 9/1991 | Smith et al. |
| 5,071,209 A | 12/1991 | Chang |
| 5,093,563 A | 3/1992 | Small et al. |
| 5,093,567 A * | 3/1992 | Staveley ..................... 250/221 |
| 5,096,282 A | 3/1992 | Margerum et al. ............. 359/3 |
| 5,103,323 A | 4/1992 | Magarinos |
| 5,111,313 A | 5/1992 | Shires |
| 5,151,724 A | 9/1992 | Kikinis |
| 5,153,670 A | 10/1992 | Jannson et al. |
| 5,175,637 A | 12/1992 | Jones et al. ................... 359/48 |
| 5,221,957 A | 6/1993 | Jannson et al. |
| 5,227,898 A | 7/1993 | Iavecchia et al. |
| 5,234,449 A | 8/1993 | Bruker ....................... 606/158 |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,331,149 A | 7/1994 | Spitzer et al. .............. 250/221 |
| 5,341,229 A | 8/1994 | Rowan |
| 5,365,354 A | 11/1994 | Jannson et al. |
| 5,379,133 A | 1/1995 | Kirk |
| 5,381,253 A | 1/1995 | Sharp et al. |
| 5,414,544 A * | 5/1995 | Aoyagi et al. ................ 349/13 |
| 5,418,631 A | 5/1995 | Tedesco et al. |
| 5,424,866 A | 6/1995 | Kikinis |
| 5,440,428 A | 8/1995 | Hegg et al. |
| 5,455,693 A | 10/1995 | Wreede et al. ................ 359/15 |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,579,026 A * | 11/1996 | Tabata ............................ 345/8 |
| 5,581,378 A | 12/1996 | Kulick |
| 5,589,956 A | 12/1996 | Morishima et al. ........... 359/15 |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith .............................. 349/5 |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,635,947 A * | 6/1997 | Iwamoto ......................... 345/7 |
| 5,640,256 A | 6/1997 | De Vré et al. .................. 359/3 |
| 5,644,369 A | 7/1997 | Jachimowicz et al. ........ 349/10 |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,682,214 A | 10/1997 | Amako et al. ................ 349/74 |
| 5,684,498 A | 11/1997 | Welch et al. .................... 345/8 |
| 5,692,077 A | 11/1997 | Stone et al. |
| 5,696,552 A | 12/1997 | Aritake et al. |
| 5,696,749 A | 12/1997 | Brazas et al. |
| 5,698,343 A | 12/1997 | Sutherland et al. ............ 430/1 |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,736,958 A | 4/1998 | Turpin |
| 5,739,930 A | 4/1998 | Sato et al. ..................... 359/23 |
| 5,744,267 A | 4/1998 | Meerholz et al. |
| 5,745,203 A | 4/1998 | Valliath et al. |
| 5,748,272 A | 5/1998 | Tanaka et al. ................ 349/86 |
| 5,748,828 A | 5/1998 | Steiner et al. |
| 5,751,243 A | 5/1998 | Turpin |
| 5,751,452 A | 5/1998 | Tanaka et al. ................ 359/52 |
| 5,757,522 A | 5/1998 | Kulick et al. |
| 5,760,933 A | 6/1998 | Aritake et al. |
| 5,764,317 A | 6/1998 | Sadovnik et al. ............... 349/5 |
| 5,768,242 A | 6/1998 | Juday ......................... 369/103 |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Loiseaux et al. ............... 359/1 |
| 5,790,284 A * | 8/1998 | Taniguchi et al. ............ 359/15 |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A | 9/1998 | Chen et al. |
| 5,801,799 A | 9/1998 | Chen et al. |
| 5,808,589 A * | 9/1998 | Fergason ........................ 345/8 |
| 5,808,759 A | 9/1998 | Okamori et al. |
| 5,808,800 A | 9/1998 | Handschy et al. .......... 359/630 |
| 5,815,222 A | 9/1998 | Matsuda et al. |
| 5,822,029 A | 10/1998 | Davis et al. |
| 5,825,340 A * | 10/1998 | Torizuka et al. ................ 345/8 |
| 5,825,448 A | 10/1998 | Bos et al. |
| 5,825,540 A | 10/1998 | Gold et al. |
| 5,828,471 A | 10/1998 | Davis et al. |
| 5,838,403 A | 11/1998 | Jannson et al. |
| 5,844,709 A | 12/1998 | Rabinovich et al. |
| 5,844,711 A | 12/1998 | Harrison |
| 5,852,504 A | 12/1998 | Kato et al. |
| 5,867,134 A * | 2/1999 | Alvelda et al. ................. 345/8 |
| 5,875,012 A | 2/1999 | Crawford et al. ............. 349/74 |
| 5,880,883 A | 3/1999 | Sudo ......................... 359/462 |
| 5,886,675 A | 3/1999 | Aye et al. ....................... 345/7 |
| 5,942,157 A | 8/1999 | Sutherland et al. ......... 252/582 |

| | | | | |
|---|---|---|---|---|
| 5,959,704 A | | 9/1999 | Suzuki et al. | 349/9 |
| 5,977,935 A | * | 11/1999 | Yasukawa et al. | 345/8 |
| 6,008,781 A | | 12/1999 | Furness, III et al. | 345/8 |
| 6,023,253 A | | 2/2000 | Taniguchi et al. | 345/7 |

FOREIGN PATENT DOCUMENTS

| | | | |
|---|---|---|---|
| EP | 0 389 123 A3 | 9/1990 | G03B/21/56 |
| EP | 0 559 435 A1 | 9/1993 | G11B/7/135 |
| EP | 0 602 813 A1 | 6/1994 | D02B/5/32 |
| EP | 0 664 495 A1 | 7/1995 | G03H/1/02 |
| EP | 0 720 040 A2 | 7/1996 | G02F/1/1335 |
| EP | 0 720 040 A3 | 4/1997 | G02F/1/1335 |
| EP | 0 777 136 A1 | 6/1997 | G02B/5/20 |
| EP | 0 785 457 A2 | 7/1997 | G02F/1/1333 |
| EP | 0 821 293 A2 | 1/1998 | G03H/1/04 |
| EP | 0 825 462 A1 | 2/1998 | G02B/5/32 |
| EP | 0 826 986 A1 | 3/1998 | G02B/5/20 |
| EP | 0 856 766 A2 | 8/1998 | G02F/1/1333 |
| EP | 0 856 768 A2 | 8/1998 | G02F/1/1347 |
| EP | 0 785 457 A3 | 10/1998 | G02F/1/1333 |
| EP | 0 821 293 A3 | 11/1998 | G03H/1/04 |
| EP | 0 856 766 A3 | 7/1999 | G02F/1/1333 |
| EP | 0 856 768 A3 | 8/1999 | G02F/1/1347 |
| FR | 2 610 733 A1 | 12/1988 | G02B/27/10 |
| GB | 2 259 213 A | 3/1993 | G09B/9/32 |
| JP | 3-84516 | 4/1991 | G02B/27/22 |
| JP | 10 54959 | 2/1998 | G02B/27/42 |
| WO | WO 94/18596 | 8/1994 | G02B/27/00 |
| WO | WO 95/04294 | 2/1995 | |
| WO | WO 97/35223 | 9/1997 | G02B/27/01 |
| WO | WO 97/36206 | 10/1997 | G02F/1/1347 |
| WO | 98/04650 | 2/1998 | |

OTHER PUBLICATIONS

Iwamoto, Kazuyo et al., "An Eye Movement Tracking Type Head Mounted Display for Virtual Reality System: Evaluation Experiments of a Proto–type System," IEEE, Feb. 10, 1994, pp. 13–18.

Iwamoto, Kazuyo et al., "High Resolution, Wide View Angle Head Mounted Display Using Eye Movement Tracking: System Structure and Evaluation Experiments," IEEE International Workshop on Robot and Human Communication, May 7, 1995, pp. 289–294.

Marrakchi, A. et al., "Generation of Programmable Coherent Source Arrays Using Spatial Light Modulators," Optics Letters, vol. 16, No. 12, Jun. 15, 1991, pp. 931–933.

Natarajan, L.V., et al., "Holographic PDLC's for Optical Beam Modulation, Deflection, and Dynamic Filter Applications," (Invited Paper), work performed at the Materials Directorate of the Air Force Research Laboratory at Wright–Patterson Air Force Base, 1998, pp. 44–51.

Patel, J. S. et al., "Electrically Controlled Polarization–independent Liquid–Crystal Fresnel Lens Arrays," Optics Letters, vol. 16, No. 7, Apr. 1, 1991, pp. 532–534.

Stankus, J. J., et al., "Electric–Field–Switchable Stratified Volume Holograms in Photorefractive Polymers," Optics Letters, vol. 19, No. 18, Sep. 15, 1994, pp. 1480–1482.

Sutherland, R. L., "Optical Limiters, Switches, and Filters Based on Poloymer Dispersed Liquid Crystals," SPIE, vol. 1080, Liquid Crystal Chemistry, Physics, and Applications, 1989, pp. 83–90.

Sutherland, R. L., et al., "Bragg Gratings in an Acrylate Polymer Consisting of Periodic Polymer–Dispersed Liquid–Crystal Planes," Chem. Mater., vol. 5, No. 10, 1993, pp. 1533–1538.

Sutherland, R. L., et al., Electrically Switchable Volume Gratings in Polymer–Dispersed Liquid Crystals, Applied Physics Letters, vol. 64, No. 9, Feb. 28, 1994, pp. 1074–1076.

Sutherland, R. L.,et al., "Switchable Holograms in New Photopolymer–Liquid Crystal Composite Materials," SPIE, vol. 2404, Mar. 1995, pp. 132–143.

Tam, Eddy C., et al., "Spatial–Light Modulator–Based Electro–Optical Imaging System," Aplied Optics, vol. 31, No. 5, Feb. 10, 1992, pp. 578–579.

Tanaka, Keiji, et al., "Holographically Formed Liquid–Crystal/Polymer Device for Reflective Color Display," 2320 Journal of the Society for Information Display, No. 1, Apr. 1994, pp. 37–40.

K. Iwamoto et al., "An eye movement tracing type head mounted display for virtual reality system: evaluation experiments of a proto–type system", pp. 13–18, IEEE, vol. 1 of 3, Oct. 2, 1994.

K. Iwamoto et al., "High resolution, wide view angle head mounted display using eye movement tracking: system structure and evaluation experiments", pp. 289–294, IEEE International Workshop on robot and Human Communication, Jul. 5–7, 1995, Tokyo.

Eddy C. Tam et al., "Spatial–light–modulator–based elector–optical imaging system", pp. 578–579, Applied Optics, vol. 31, No. 5, Feb. 10, 1992.

A. Marrakchi et al., "Generation of programmable coherent source arrays using spatial light modulators", pp. 931–933, Optics Letters, vol. 16, No. 12, Jun. 15, 1991.

J.S. Patel et al., "Electrically controlled polarization–independent liquid–crystal Fresnel lens arrays", pp. 532–534, Optics Letters, vol. 16, No. 7, Apr. 1, 1991.

J.J. Stankus et al., "Electric–field–switchable stratified volume holograms in photorefractive polymers", pp. 1480–1482, Optics Letters, vol. 19, No. 18, Sep. 15, 1994.

R.L. Sutherland et al., "Electrically switchable volume gratings in polymer–dispersed liquid crystals", pp. 1074–1076, Applied Physics letters, vol. 64, No. 9, Feb. 28, 1994.

A. Marrakchi et al., "Generation of Programmable Coherent Source Array Using Spatial Light Modulators," Feb. 1991, Optical Society of America, Optics Letter, vol. 16., No. 12.

K. Iwamoto et al., "An Eye Movement Tracking Head Mounted Display for Virtual Reality System:—Evaluation Experiments of a Proto–type System," Feb. 1994, IEEE.

K. Iwamoto et al., "High Resolution, Wide View Angle Head Mounted Display Using Eye Movement Tracking:—System Structure and Evaluation Experiments," 1995, IEEE.

* cited by examiner

THEORETICAL LENS FORM

KINOFORM REPRESENTATION

BINARY APPROXIMATION (8 LEVELS)

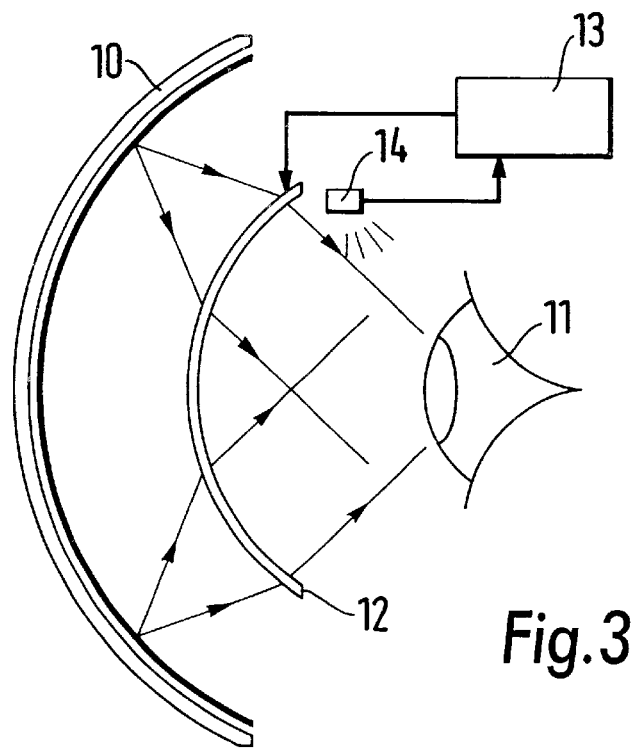
Fig.3
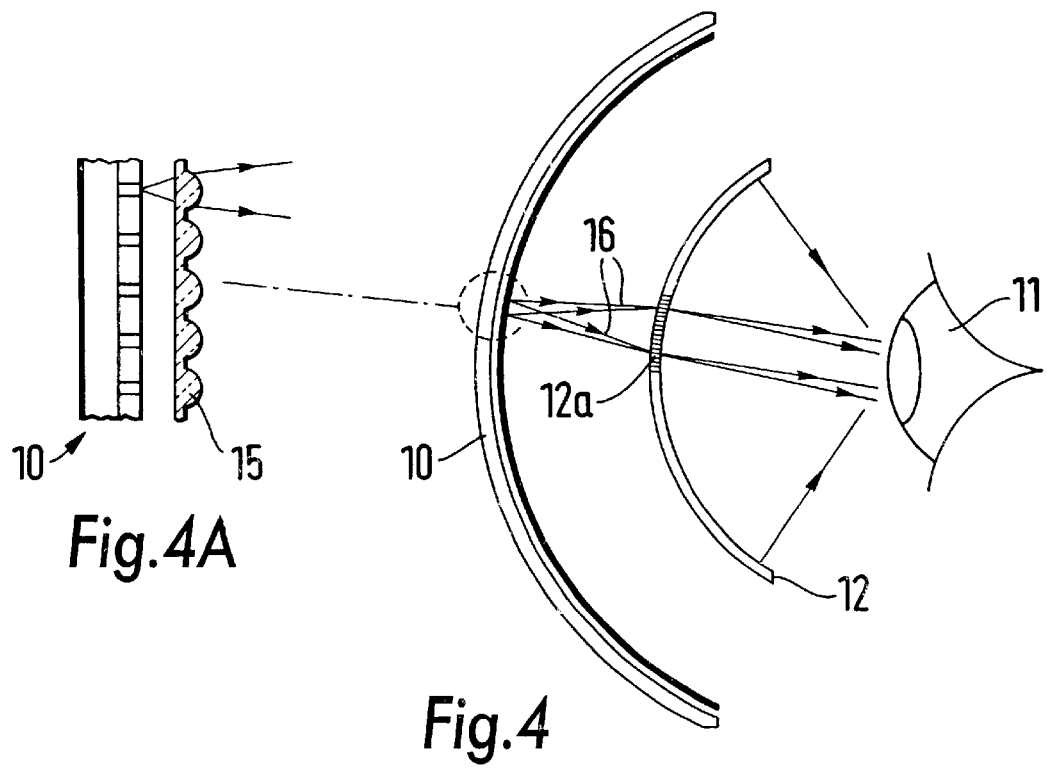
Fig.4A
Fig.4

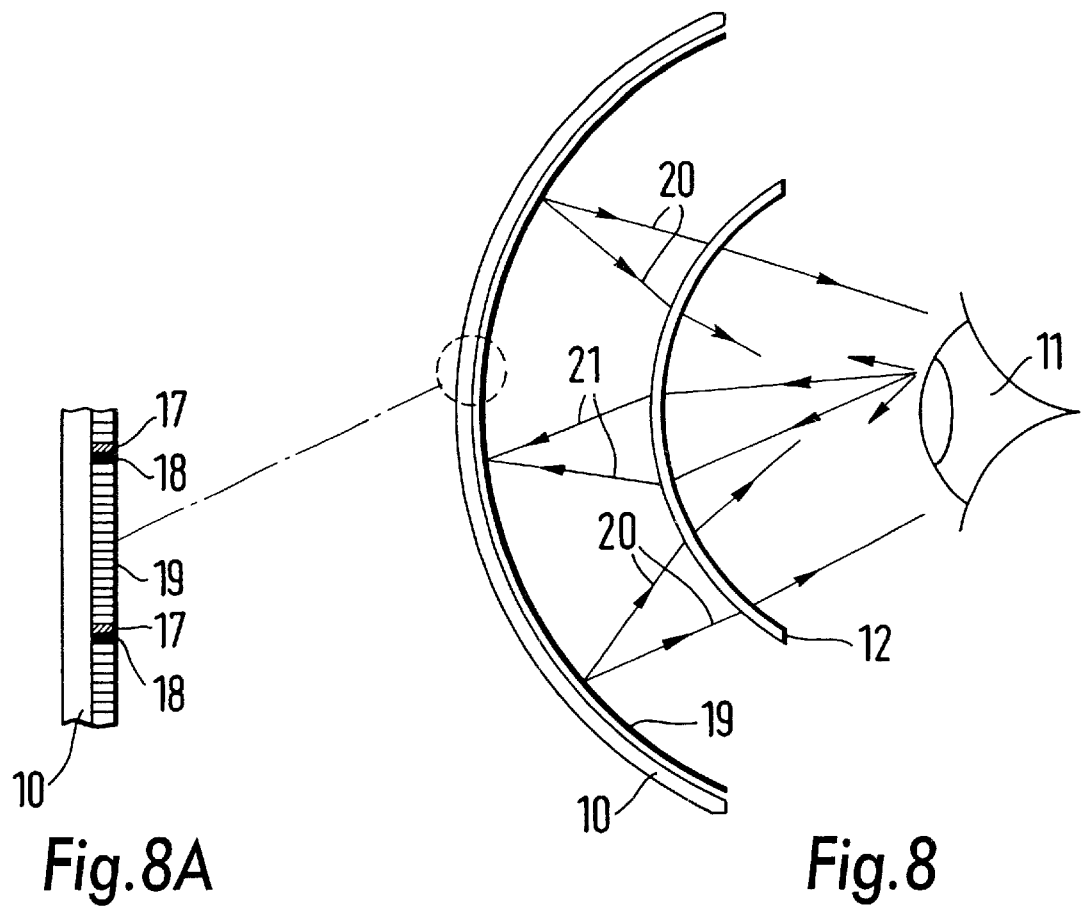
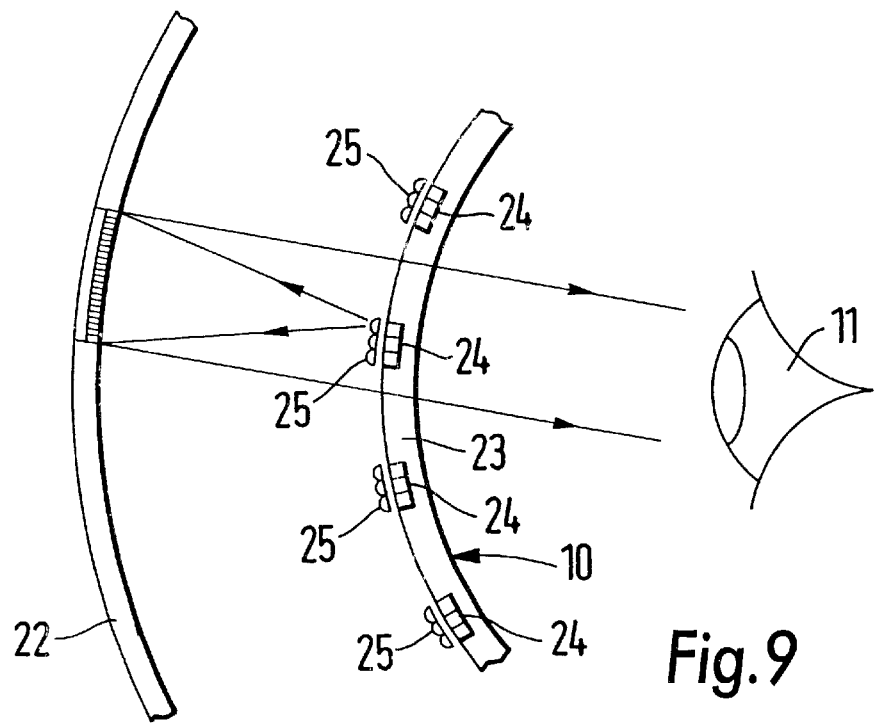
Fig.8A  Fig.8
Fig.9

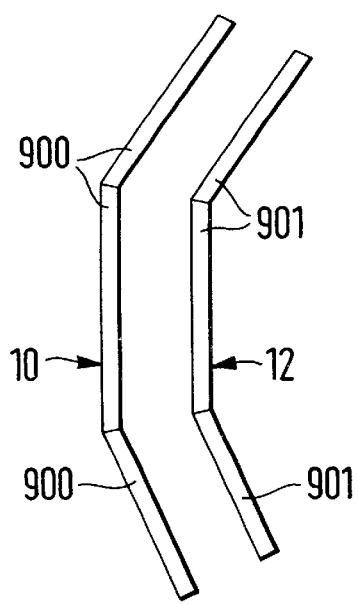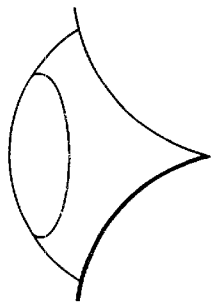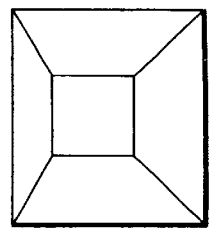
Fig.21
Fig.21A
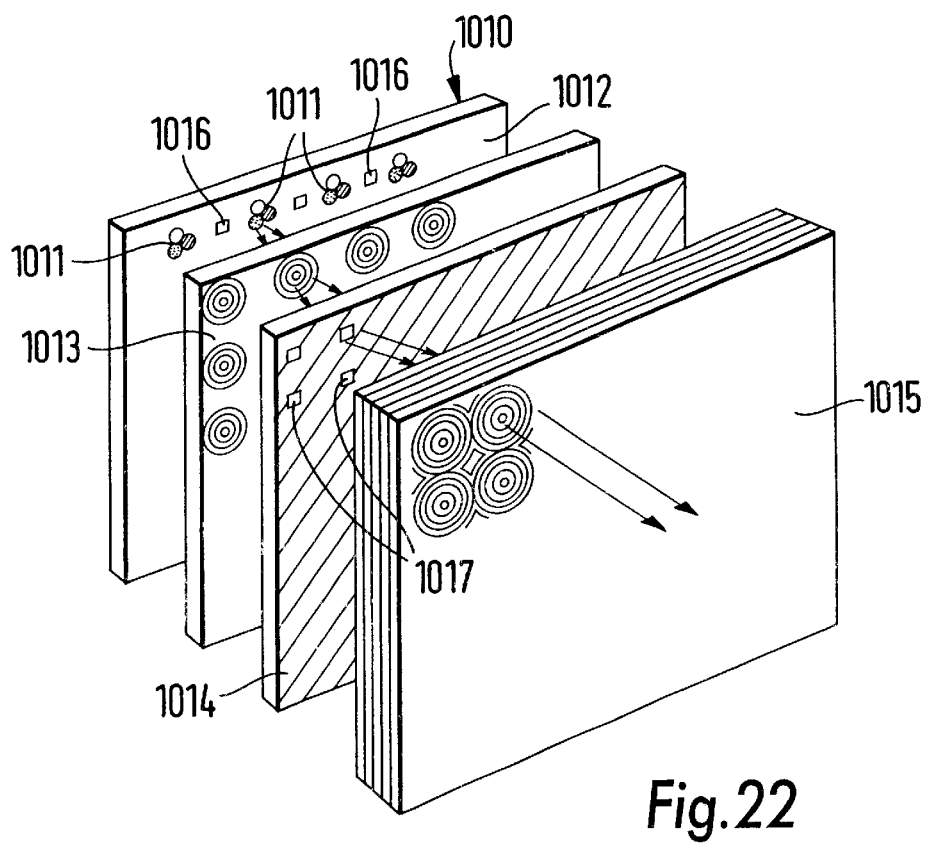
Fig.22

METHOD OF AND APPARATUS FOR VIEWING AN IMAGE

This application is a continuation-in-part of International Application PCT/GB97/00711 filed Mar. 14, 1997, which designated the United States.

FIELD OF THE INVENTION

This invention relates to a method of and apparatus for viewing an image.

BACKGROUND OF THE INVENTION

In head-mounted optical displays (such as are used in the recreation industry for viewing virtual reality images), it has been the practice to project an image to be viewed into the observer's eyes using conventional refractive and reflective optical elements, i.e. lenses and mirrors. However, in head-mounted displays where weight and size are major considerations it is normally possible to provide only a very small field of view by this means, which is a disadvantage when it is desired to provide the observer with the sensation of being totally immersed in a virtual world. In an attempt to overcome this problem, it has been proposed to use so-called "pancake windows", i.e. multi-layer devices which use polarisation and reflection techniques to simulate the effect of lenses and mirrors. However, such devices suffer from the problem that they have low transmissivity.

Particularly with the factors of size and weight in mind, wide field optics designs have turned to diffractive optical solutions. It is known that diffractive techniques can be used to simulate the effect of a lens, by reducing the profile to a kinoform (FIGS. 1 and 2) or by the use of fixed surface or volume holograms. However diffractive optics have always suffered from extreme chromatic aberration when used in full colour imaging systems. Correction methods which have included multiplexing holograms recorded with different wavelengths in a single emulsion have been suggested. Such schemes still exhibit residual crosstalk between the colour channels which makes them inappropriate for high quality imaging systems.

Additionally, wide fields of view lead to problems in other forms of aberration correction, as well as difficulties in supporting the data bandwidth required to support high resolution across the entire field of view.

SUMMARY OF THE INVENTION

It is an object of the present invention to provide a method of and apparatus for viewing images which improve on the techniques described above.

According to a first aspect of the present invention, there is provided a method of viewing an image, the method comprising transmitting an image into an eye of an observer by means of a dynamic optical device, the dynamic optical device being operative to create a modulation in respect of at least one of phase and amplitude in light transmitted or reflected thereby, said modulation being variable from one point or spatial region in the optical device to another, and wherein the modulation at any point or spatial region can be varied by the application of a stimulus, and altering the characteristics of the dynamic optical device so that the dynamic optical device acts sequentially to direct light of different colours to the observer's eye.

The expression "transmitting an image" is intended to include the formation of a virtual aerial image at some point, or the projection of a real image onto the surface of the observer's retina.

According to a second aspect of the present invention, there is provided apparatus for viewing an image, comprising a dynamic optical device, the dynamic optical device being operative to create a modulation in respect of at least one of phase and amplitude in light transmitted or reflected thereby, said modulation being variable from one point or spatial region in the optical device to another, and control means operative to apply a stimulus to the dynamic optical device, whereby the modulation at any point or spatial region can be varied, the control means being operative to alter periodically the characteristics of the dynamic optical device so that the device acts sequentially to direct light of different colours to the observer's eye.

The dynamic optical device can comprise a succession of layers which are configured to act upon the primary wavelengths, respectively, or the different colour channels may all be embodied in the one layer of the dynamic optical device.

Moreover, the optical power (focal length), size, position and/or shape of the exit pupil and other optical parameters can also be controlled.

The above-described method and apparatus allow the provision not only of a relatively wide field of view, but also a large exit pupil, a movable exit pupil of variable shape, and high resolution.

Conveniently, the dynamic optical device comprises a spatial light modulator containing an array of switchable elements in which the optical state of each element can be altered to create a change in phase and/or amplitude in the light incident thereon. Alternatively, the dynamic optical device can comprise an array of switchable prerecorded holographic elements, wherein more complex phase functions can be encoded within the holograms. In this case, the dynamic optical device can also comprise non-switchable holographic elements.

Advantageously, the dynamic optical device comprises an electrically switchable holographic composite.

Desirably, the dynamic optical device is used in a range in which the phase and/or amplitude modulation varies substantially linearly with applied stimulus.

The dynamic optical device is preferably used in a range in which it does not substantially affect the amplitude and/or wavelength characteristics of the light transmitted or reflected thereby.

The dynamic optical device can be in the form of a screen adapted for mounting close to the observer's eye. The screen can be of generally curved section in at least one plane. Alternatively, for ease of manufacture, the screen may be planar. Conveniently, the apparatus also comprises means for engaging the screen with the observer's head in a position such that the curve thereof is generally centred on the eye point.

In one arrangement, the dynamic optical device acts upon light transmitted therethrough, and the image generator is located on a side of the dynamic optical device remote from the intended position of the observer's eye. In an alternative arrangement, the dynamic optical device acts upon light reflected thereby, and the image generator is at least partially light-transmitting and is located between the dynamic optical device and the intended position of the observer's eye.

The apparatus may include image generation means configured off-axis from the general direction of the observer's eye in use. In that case, the image generation means can be non-light transmitting.

In one arrangement, the dynamic optical device comprises a plurality of discrete optical elements in close juxtaposition to each other, each of which acts as an individual lens or mirror. Conveniently, some of the discrete optical elements act to direct to the observer's eye light of one colour, while others of the discrete optical elements act to direct to the observer's eye light of other colours.

In one preferred embodiment of the invention, the apparatus may comprise left and right image generation means, left and right dynamic optical devices and left and right side portions within which said left and right image generation means are housed, said left and right image generation means being operative to project towards said left and right dynamic optical devices respectively, thereby displaying a binocular image. The apparatus can also be arranged to provide for the full range of accommodation and convergence required to simulate human vision, because the parameters governing the factors can be altered dynamically.

Advantageously, the dynamic optical device functions to correct aberrations and/or distortions in the image produced by the image generator. The dynamic optical device can also function to create a desired position, size and/or shape for the exit pupil.

The method may further comprise the steps of controlling the characteristics of the dynamic optical device to create an area of relatively high resolution in the direction of gaze of the observer's eye, the dynamic optical device providing a lesser degree of resolution of the image elsewhere, and sensing the direction of gaze of the observer's eye and altering the characteristics of the dynamic optical device in accordance therewith, so that the area of relatively high resolution is repositioned to include said direction of gaze as the latter is altered.

The apparatus may further comprise sensing means operative to sense the direction of gaze of the observer's eye, and the control means being operative on the dynamic optical device to create an area of relatively high resolution in said direction of gaze, the dynamic optical device providing a lesser degree of resolution of the image elsewhere, the control means being responsive to the sensing means and being operative to alter the characteristics of the dynamic optical device to move said area of relatively high resolution to follow said direction of gaze as the latter is altered.

Moreover, in accordance with a third aspect of the invention, there is provided apparatus for viewing an image, comprising a dynamic optical device, the dynamic optical device being operative to create a modulation in respect of at least one of phase and amplitude in light transmitted or reflectual thereby by means of which the observer's eye views an image in use, sensing means operative to sense the direction of gaze of the observer's eye, and control means which acts on the dynamic optical device to create an area of relatively high resolution in said direction of gaze, the dynamic optical device providing a lesser degree of resolution of the image elsewhere, the control means being responsive to the sensing means and being operative to alter the characteristics of the dynamic optical device to move said area of relatively high resolution to follow said direction of gaze as the latter is altered.

It will be appreciated that the features identified above as being preferred features of the second aspect of the invention may also be incorporated into the apparatus of the third aspect of the invention.

Preferably, the sensing means utilises radiation which is scattered from the observer's eye and which is detected by detector means, and the dynamic optical device may also function to project said radiation onto the eye and/or to project to the detector means the radiation reflected by the eye.

Conveniently, the sensing means includes a plurality of sensors adapted to sense the attitude of the observer's eye, the sensors being positioned in or on the dynamic optical device and/or the image generator.

Preferably, the sensing means comprises emitter means operative to emit radiation for projection onto the observer's eye and detector means operative to detect radiation reflected back from the eye.

Desirably, the sensing means utilises infra-red radiation. In this case the dynamic optical device can be reconfigured to handle visible light on the one hand and infra-red radiation on the other.

The apparatus can further comprise at least one optical element provided in tandem with the dynamic optical device, which acts upon infra-red light but not upon visible light.

The detector means can be provided on a light-transmitting screen disposed between the image generator and the dynamic optical device.

Conveniently, a reflector is disposed between the image generator and the light-transmitting screen, and is operative to reflect the infra-red radiation whilst allowing transmission of visible light, such that the infra-red radiation after reflection by the observer's eye passes through the dynamic optical device and the light-transmitting screen, and is reflected by said reflector back towards the screen.

In cases where the sensing means operates on infra-red principles, it is necessary to focus onto the detectors the returned infra-red radiation after reflection from the observer's eye. Although it is possible to employ for this purpose the same optical elements as are used to focus the image light onto the observer's eye, the disparity in wavelength between visible light and infra-red radiation means that this cannot always be achieved effectively. According to a development of the invention, the sensing function is performed not by infra-red radiation but rather by means of visible light. The light can be rendered undetectable by the observer by using it in short bursts. Alternatively, where the emitter means is provided at pixel level in the field of view, the wavelength of the light can be matched to the colour of the surrounding elements in the image. As a further alternative, the light can be in a specific narrow band of wavelengths. This technique also has applicability to viewing apparatus other than that including dynamic optical devices, and has a general application to any apparatus where eye tracking is required.

Preferably, the emitter means and/or the detector means are provided on a light-transmitting screen disposed between the image generator and the dynamic optical device.

Desirably, the image generator is in the form of a display screen, and the emitter means and/or the detector means are provided in or on the display screen.

Conveniently, the emitter means are provided in or on the display screen, a beamsplitter device is disposed between the display screen and the dynamic optical device and is operative to deflect radiation reflected by the observer's eye laterally of the main optical path through the apparatus, and the detector means are displaced laterally from the main optical path.

Where the image generator produces a pixellated image, the emitter means and/or detector means can be provided at pixel level within the field of view.

Advantageously, the image generator and the dynamic optical device are incorporated into a thin monolithic structure, which can also include a micro-optical device operative to perform initial bean shaping. The monolithic structure can also include an optical shutter switchable between generally light-transmitting and generally light-obstructing states.

The apparatus can further comprise means to permit the viewing of ambient light from the surroundings, either separately from or in conjunction with the image produced by the image generator. In this case, the image generator can include discrete light-emitting elements (such as lasers or LEDs) which are located on a generally light-transmitting screen through which the ambient light can be viewed.

Preferably, the light-emitting elements of said device are located at the periphery of said screen, and the screen acts as a light guide member and includes reflective elements to deflect the light from the light-emitting elements towards the dynamic optical element.

Desirably, the image generator is in the form of a display panel, and the panel is mounted so as to be movable between a first position in which it confronts the dynamic optical device and a second position in which it is disposed away from the dynamic optical device.

In an alternative arrangement, the image generator is in the form of a display screen and displays an input image, and the apparatus further comprises detector means operative to sense the ambient light, a processor responsive to signals received from the detector means to display on the display screen an image of the surroundings, and means enabling the display screen to display selectively and/or in combination the input image and the image of the surroundings.

In one particular arrangement, the image generator comprises an array of light-emitting elements each of which is supplied with signals representing a respective portion of the image to be viewed, wherein the signals supplied to each light-emitting element are time-modulated with information relating to the details in the respective portion of the image, and the area of relatively high resolution is produced by means of the dynamic optical device switching the direction of the light from the light-emitting elements in the region of the direction of gaze of the observer's eye.

The apparatus can further comprise tracking means operative to track the head positions of a plurality of observers, and a plurality of sensing means each of which is operative to detect the direction of eye gaze of a respective one of the observers, with the dynamic optical device being operative to create a plurality of exit pupils for viewing of the image by the observers, respectively.

The image produced by the image generator can be pre-distorted to lessen the burden on the dynamic optical device. In this case, the distinction between the image display and the dynamic optical device is less well defined, and the functions of the image generator and the dynamic optical device can be combined into a single device, such as a dynamic hologram. More particularly, a spatial light modulator can be used to produce a dynamic diffraction pattern which is illuminated by one or more reference beams.

Preferably, said image for viewing by the observer is displayed on a display screen, which can be of generally curved section in at least one plane. The apparatus can further comprise means for engaging the display screen with the observer's head in a position such that the curve thereof is generally centred on the eye point.

The apparatus can form part of a head-mounted device.

In a preferred arrangement as described above, the dynamic optical device functions not only to focus image light onto the observer's eye, but also to project radiation from the emitters onto the eye, and/or to project the radiation reflected by the eye onto the detectors. According to a fourth aspect of the present invention, this general technique can be applied to viewing apparatus in which conventional optics rather than a dynamic optical device are employed.

Thus, according to the said fourth aspect of the invention, viewing apparatus comprises an image generator operative to generate an image for viewing by an observer's eye, an optical system for transmitting said image to the observer's eye position, sensing means operative to sense the direction of gaze of the observer's eye, and control means responsive to the sensing means and operative to act on the image generator and/or the optical system to modify said image transmitted to the eye in accordance with the direction of gaze of the eye, the sensing means including emitter means operative to emit radiation for projection onto the observer's eye, and detector means operative to detect said radiation after reflection by said eye, the optical system also functioning to transmit said radiation from the emitter means onto said eye and/or to transmit said radiation reflected from said eye to the detector means.

Preferably, said radiation comprises infra-red radiation.

In a particular arrangement, the optical system includes at least one optical element which acts upon both visible light and infra-red radiation, and at least one second optical element which acts upon infra-red radiation but not upon visible light. In this way, the optical system can have a different focal length for visible light than that for infra-red radiation.

In one embodiment, the detector means (and preferably also the emitter means) are provided on a light-transmitting screen disposed between the image generator and the optical system. Desirably, a reflector (such as a holographic/diffractive reflector or a conventional dichroic reflector) is disposed between the image generator and the light-transmitting screen, and is operative to reflect the infra-red radiation whilst allowing transmission of visible light, such that the infra-red radiation after reflection by the observer's eye passes through the optical system and the light-transmitting screen, and is reflected by said reflector back towards the screen.

In the case where the image generator is in the form of a display screen, the emitter means and/or the detector means can be provided in or on the display screen. Alternatively, the emitter means can be provided in or on the display screen, a beamsplitter device can be disposed between the display screen and the optical system so as to deflect infra-red radiation reflected by the observer's eye and passing through the optical system laterally of the main optical path through the apparatus, and the detector means can be displaced laterally from said main optical path.

Advantageously, the image generator generates a pixel-lated image, and the emitter means and/or the detector means are provided at pixel level.

In a preferred arrangement as described above, the sensing means comprises emitters and detectors provided at pixel level within the field of view. According to a fourth aspect of the present invention, this general technique can be applied to viewing apparatus in which conventional optics rather than a dynamic optical device are employed.

Thus, according to the said fourth aspect of the invention, viewing apparatus comprises an image generator operative to generate an image for viewing by an observer's eye, an optical system for transmitting said image to the observer's eye position, sensing means operative to sense the direction of gaze of the observer's eye, and control means responsive to the sensing means and operative to act on the image generator and/or the optical system to modify said image transmitted to the eye in accordance with the direction of gaze of the eye, the sensing means including emitter means operative to emit radiation for projection onto the observer's eye, and detector means operative to detect said radiation after reflection by said eye, the emitter means and/or the detector means being provided at pixel level within the field of view of the image.

Particularly in the case where the image generator is in the form of a display screen, the emitter means and/or the detector means can be provided at pixel level in or on the display screen. Alternatively, the emitter means and/or the detector means can be provided at pixel level on a light-transmitting screen disposed between the image generator and the optical system.

Preferably, said radiation comprises infra-red radiation.

In a particular arrangement, the optical system includes at least one optical element which acts upon both visible light and infra-red radiation, and at least one second optical element which acts upon infra-red radiation but not upon visible light. In this way, the optical system can have a different focal length for visible light than that for infra-red radiation.

BRIEF DESCRIPTION OF THE DRAWINGS

The invention will now be further described, by way of example only, with reference to the remaining Figures of the accompanying drawings, in which:

FIG. 3 is a general arrangement drawing illustrating a viewing apparatus and method according to the present invention;

FIG. 4 is a schematic view of a first embodiment of viewing apparatus according to the present invention;

FIG. 4A is a detail of part of the apparatus shown in FIG. 4;

FIGS. 4B to 7 are graphs illustrating various characteristics of the apparatus of FIG. 4;

FIG. 8 is a schematic view of a modification to the first embodiment of the viewing apparatus;

FIG. 8A is a detail of part of the apparatus shown in FIG. 8;

FIG. 9 is a schematic view of a second embodiment of viewing apparatus according to the present invention;

FIGS. 21 and 21A illustrate the use of planar display screens and dynamic optical devices;

FIG. 22 is an exploded perspective view of apparatus for viewing an image, employing an ESHC as the dynamic optical device;

DESCRIPTION OF THE PREFERRED EMBODIMENTS OF THE INVENTION

Figure 1:
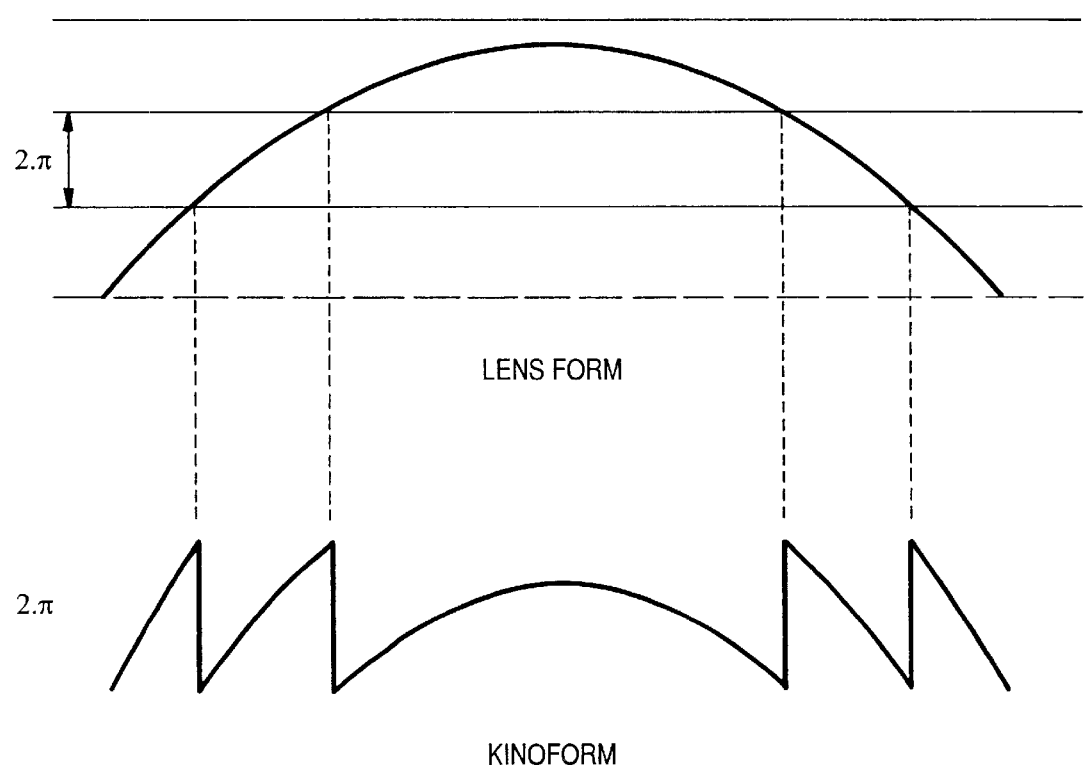
FIG. 1 is a schematic view of a kinoform lens of known type.
Figure 2:
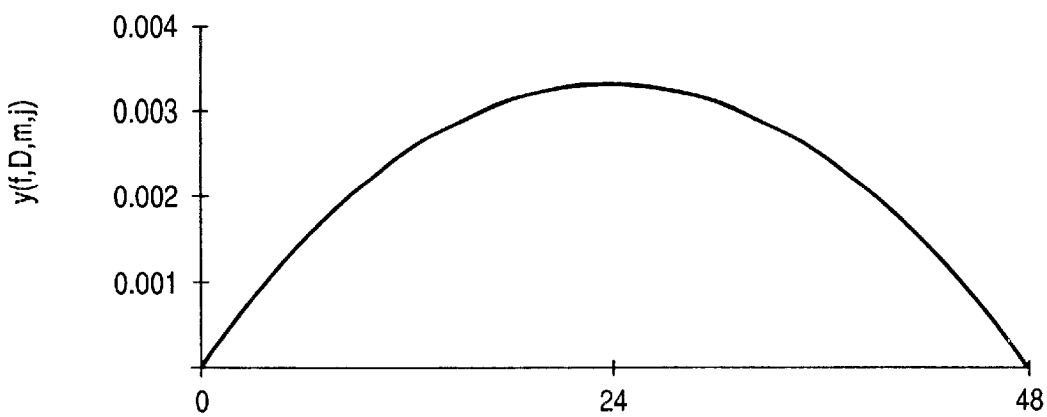
FIG. 2 is a graphical arrangement of a kinoform lens, demonstrating how the lens can be implemented in practice.
Figure 2:
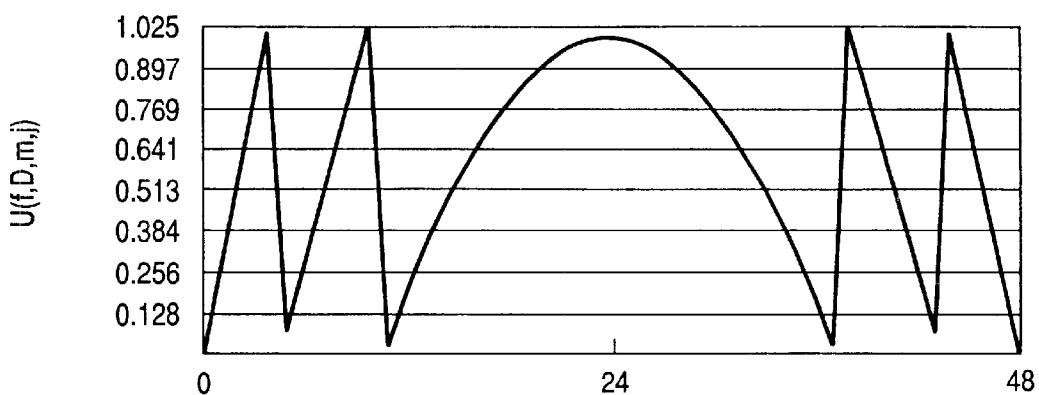
Figure 2:
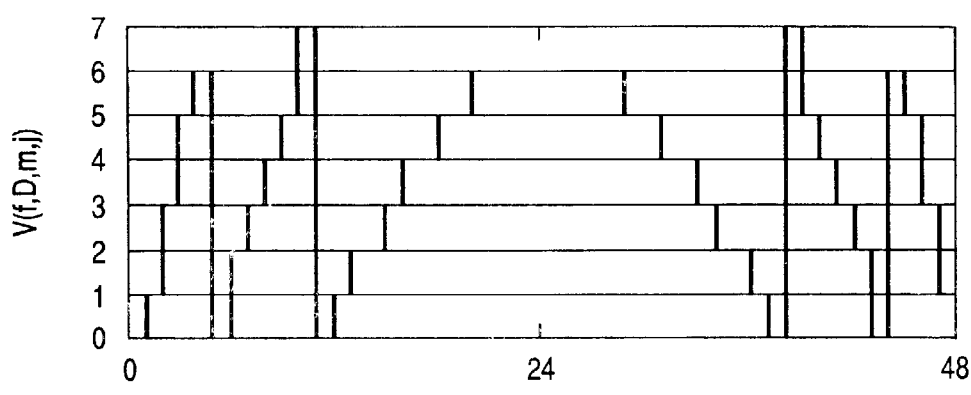

Referring to FIG. 3, there is shown a general arrangement of viewing apparatus which comprises a display screen 10 on which is displayed an image to be viewed by an eye 11 of an observer. Interposed between the display screen 10 and the eye 11 is a dynamic optical element (in this case, a lens) in the form of a screen 12. The dynamic lens comprises a spatial light modulator (such as a liquid crystal device) to which a stimulus is applied by a control device 13 to create an area of relatively high resolution in the direction of gaze of the eye 11, the remaining area of the modulator providing a lesser degree of resolution. Sensing means 14 is operative to sense the attitude of the eye 11, and the control device 13 is responsive to signals received from the sensing means 14 and alters the characteristics of the modulator so that the area of relatively high resolution is moved so as to follow the direction of gaze of the observer's eye 11 as this is altered.

The apparatus and its characteristics will now be described in more detail. Although the described apparatus is intended for use in a head-mounted device for viewing virtual reality images, it will be appreciated that the apparatus has many other uses and applications as well.

In the ensuing description, reference will be made to the apparatus as being applied to one of the observer's eyes. However, when used for virtual reality applications, two such apparatuses will in fact be provided, one for each eye. In this case, the respective display screens can (if desired) be used to display stereoscopic images to provide a 3-D effect to the observer.

FIGS. 4 and 4A show a first actual embodiment of the viewing apparatus, wherein similar components are designated by the same reference numerals as used in FIG. 3. However, the control device 13 and the sensing means 14 are omitted for the sake of clarity. In this embodiment, the display screen 10 and the screen 12 are each of curved configuration and are centred generally on the rotation axis of the observer's eye 11.

The spatial light modulator comprising the screen 12 can operate on phase and/or amplitude modulation principles. However, phase modulation is preferred because amplitude modulation devices tend to have relatively low light efficiency. The modulator has a phase modulation depth of not less than 2 and its phase shift varies linearly with applied voltage.

The aperture and focal length of the dynamic lens formed by the spatial light modulator, are dictated by the resolution of the modulator. The form of the lens is modified in real time, allowing the focal length to be changed so that conflicts between accommodation and convergence can be resolved. In addition, focus correction for different users can be carried out electronically rather than mechanically.

Figure 4B:
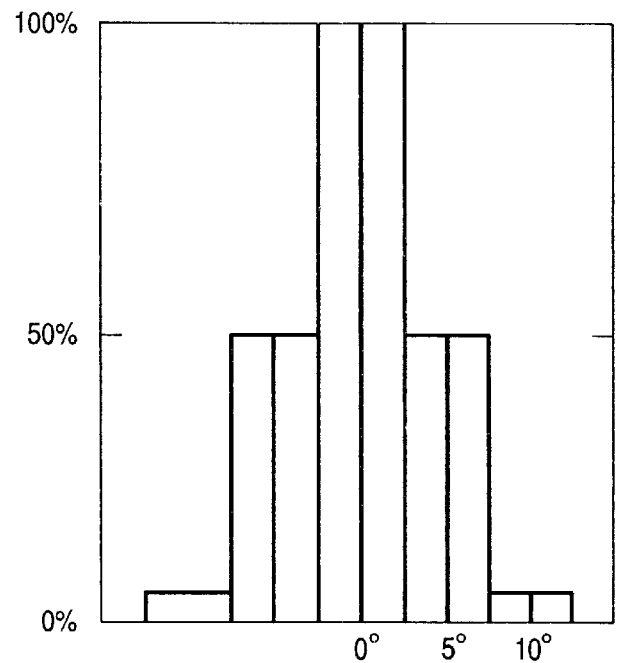

The dynamic lens is intended to provide an area of interest (AOI) field of view, the AOI being a high resolution region of the field of view that corresponds to the instantaneous direction of gaze of the observer's eye. By reducing the size of the AOI, certain benefits arise such as minimising the amount of imagery that needs to be computed for display on the screen 10 at any instant, improving the image quality by allowing the dynamic lens to operate at low field angles, and increasing the effective image brightness and resolution of the display. FIG. 4B shows in graphic form the variation of resolution across the AOI.

Normally, the optics required to achieve human visual fields of view involve very complex optical designs consisting of many separate lens elements. The concept employed in the present invention achieves economy of design by using an adaptive lens in which its transform is recomputed for each resolution cell of the field of view. Furthermore, since the dynamic lens is used with a device (eye tracker) which senses the attitude of the observer's eye, only a modest AOI is required. Accordingly, the form of the lens is simplified, although separate lens forms are required for each increment in the field of view to ensure that collimation is preserved over the entire field of view.

The diffractive principles employed by the spatial light modulator are ideally suited to correcting for monochromatic aspheric and high order spherical aberrations, distortion, tilt and decentring effects. However, since diffractive structures suffer from chromatic aberration, it is necessary to compute separate forms for each wavelength, and in particular to re-compute the diffraction pattern for each of the primary wavelengths used in the display. For example, in one arrangement the dynamic optical device is configured to produce an array of discrete micro-lenses in close juxtaposition to each other, with some of the micro-lenses acting to direct to the observer's eye red light, whilst other micro-lenses act to direct green and blue light to the observer's eye, respectively. In a second arrangement, the characteristics of the dynamic optical device are altered periodically so that, at least in the area of high resolution, it acts to direct to the observer's eye red, green and blue light in temporal sequence. In a third arrangement, the dynamic optical device comprises several layers which are designed to act on red, green and blue wavelengths, respectively. The resolution of the apparatus is dependent upon several factors, especially the dimensions of the dynamic lens, the resolution of the spatial light modulator, the number of phase levels in the spatial light modulator, focal length and pixel size of the display screen 10. In order to achieve a satisfactory resolution, the dynamic lens is operated not as a single lens, but rather as an array of micro-lenses as depicted schematically at 12a in FIG. 4.

Diffracting structures are subject to similar geometric aberrations and distortions to those found in conventional lenses. By using an eye tracker in conjunction with an area of high resolution in the dynamic lens, the effects of distortion are minimal, particularly since low relative apertures are used. Generally, diffractive optics are more difficult to correct at high optical powers. From basic aberration theory, the field angle achievable with the dynamic lens is limited to a few degrees before off-axis aberrations such as coma start to become significant and it becomes necessary to re-compute the diffraction pattern.

In general, the correction of geometric distortions and matching of the AOI with lower resolution background imagery can be carried out electronically. Particularly in the case where the dynamic lens is implemented in a curved configuration (as depicted in FIG. 4), the effects of geometric distortion will be minimal.

The main factors affecting transmission through the dynamic lens are the diffraction efficiency, effective light collection aperture of the optics, and transmission characteristics of the medium employed for the dynamic lens. Because of the geometry of the dynamic lens, the effect of occlusions and vignetting will be minimal. The most significant factor tends to be the collection aperture. In order to maximise the transmission of the display to the dynamic lens, it is possible to include an array of condensing lenses. FIG. 4A shows a detail of the display screen 10 depicted in FIG. 4, wherein an array 15 of micro-lenses is disposed in front of the display screen 10 to perform initial beam-shaping on the light emitted from the screen, before this is transmitted to the dynamic lens. Alternatively, this beam-shaping function can be performed by means of diffractive or holographic components.

Because the operation of the dynamic lens is governed by the attitude of the observer's eye, the majority of the processing of the image displayed on the screen 10 at any one time will be concerned with the image region contained in the exit pupil. To take full advantage of the eye's visual acuity characteristics, the eye tracker is arranged to operate at bandwidths of at least 1000 Hz in order to determine the tracking mode of the eye (for example smooth pursuit or saccade).

Figure 5:
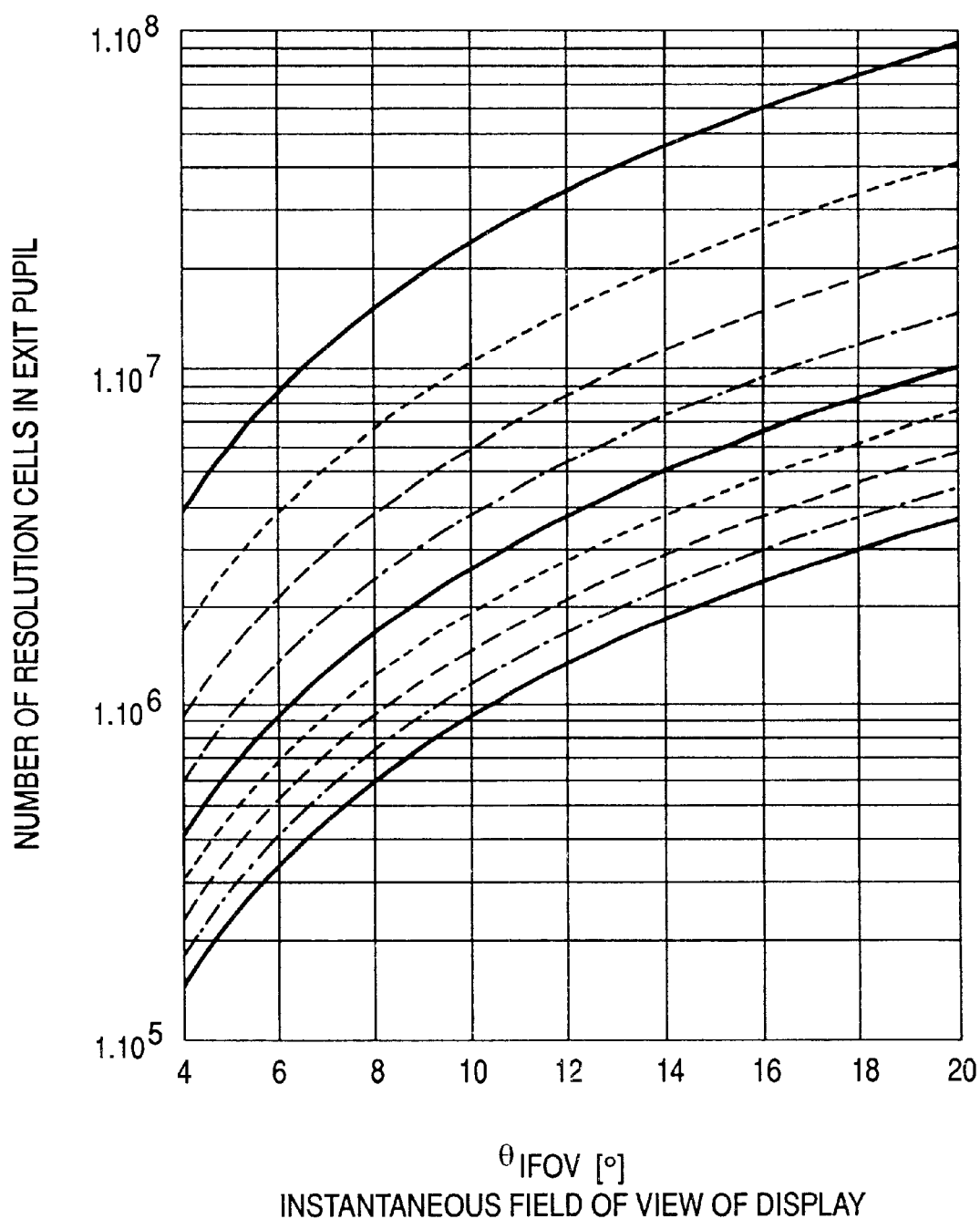

The picture content in the exit pupil of the dynamic lens at any given time will depend upon the AOI field of view, and the field angle and resolution of the dynamic lens. FIG. 5 shows in graphic form a calculation of the number of resolution cells in the exit pupil that will need to be up-dated per frame as a function of the AOI for different values of the dynamic lens field angle. For the purpose of these calculations, it has been assumed (for illustrative purposes) that the dynamic lens consists of 20×20 micro-lenses each of 0.5 mm size, with each micro-lens having a resolution of 48×48. It has also been assumed that the dynamic lens has a field of view of 7°, and that the AOI is 10°. This results in a total of about one million cells in the exit pupil, equivalent to a 1000×1000 array. Taking into account the dynamic lens field angle, each of these cells will need to be up-dated approximately 2 times per frame, i.e. 2 million cell up-dates per frame are required. By extrapolating from the size of the exit pupil to the maximum array size necessary to provide the same resolution over an entire field of view of, say, 135°×180°, it can be determined that a dynamic lens comprising of the order of 113×113 micro-lenses will be required (equivalent to a 5400×5400 cell spatial light modulator).

Figure 7:
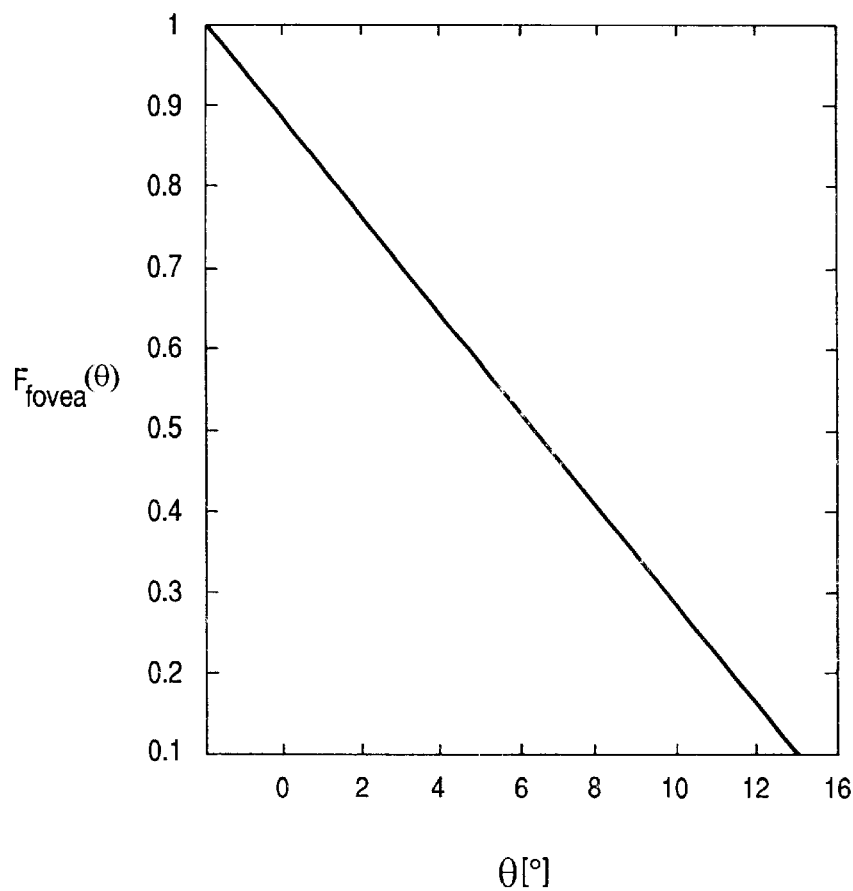
Figure 6:
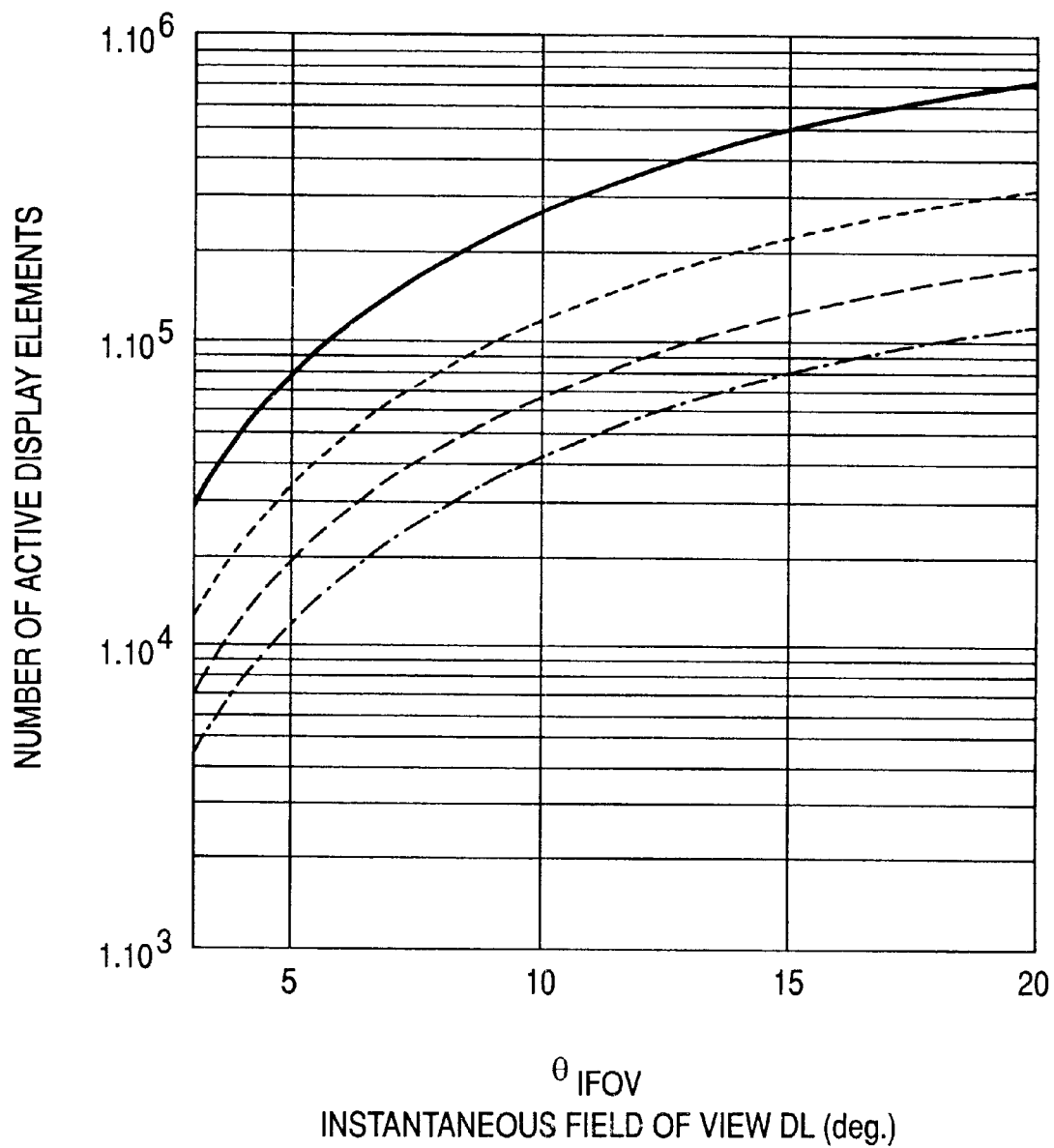

The specification of the input image display (i.e. the image as displayed on the screen 10) will be determined by the required display resolution. For example, by aiming to match the 1 minute of arc resolution of the human visual system, the display will need to provide a matrix of 8100× 8100 pixels to achieve the desired performance over a field of view of 135°×180°. The number to be up-dated in any given frame will be considerably smaller. FIG. 6 shows in graphic form the number of active display elements required in the exit pupils, assuming a variable resolution profile of the form shown in FIG. 7.

Significant economy in the computation of the input imagery can be achieved by exploiting the rapid fall-off of human visual acuity with angle. Since only 130,000 pixels can be observed by the eye at any time, and noting that the eye is not very good at distinguishing intermittent events at moderate rates (typically 30 per second), it can be concluded that the apparatus of the present invention presents a processing requirement which is not significantly bigger than that of a 625 line television.

The exit pupil of the dynamic lens is not subject to the same physical constraints as that of a conventional lens system, since it is defined electronically. According to the normal definition of the term, it could be said that the exit pupil covers the whole of the 135°×180° field of view. However, because of the eye tracking function employed in the present invention, it is more appropriate to consider the exit pupil as being the region of the spatial light modulator array contained within the eye-tracked area of interest. The remainder of the field of view is filled with imagery whose resolution progressively decreases as the periphery is approached.

FIG. 8 illustrates a particular manner of implementing the eye tracking function, with similar components being accorded the same reference numerals as employed in FIG. 4. In this embodiment, the eye tracking function is achieved by means of an array of emitters 17 and detectors 18 provided on a screen 19 disposed immediately in front of the display screen 10. Radiation (such as infra-red radiation) is emitted by the emitters 17 and is directed by the dynamic lens 12 as a broad wash across the observer's eye 11, as depicted by arrows 20. The radiation reflected by the eye 11 is then focussed by the dynamic lens 12 onto the detectors 18, as depicted by arrows 21. Thus, the dynamic lens 12 not only functions to transmit to the observer's eye the image as displayed on the screen 10, but also forms an important part of the eye-tracker. The spatial frequencies of the emitters 17 and detectors 18 do not have to be very high, but are sufficient to resolve the eye of the pupil or some other ocular parameter.

FIG. 9 shows an alternative embodiment in which the dynamic optical element takes the form of a mirror 22 rather than a lens. In this arrangement, the display screen 10 is interposed between the dynamic mirror 22 and the observer's eye, and is formed by a generally light-transmitting screen 23 on which are provided a series of visible light emitters 24 (such as LEDs, lasers or phosphors) in red-green-blue triads. The triads are spaced apart from one another, to permit the eye 11 to view the displayed image after reflection by the dynamic mirror 22 and subsequent passage through the screen 23. Each triad is fronted by a micro-lens array 25 which performs initial beam shaping.

The dynamic mirror 22 is based on the same diffractive optical principles as the dynamic lens. The use of reflection techniques can offer some advantages over a transmissive mode of operation because the drive circuitry for the spatial light modulator can be implemented in a more efficient way, for example on a silicon backplane. As in the case of the dynamic lens, the limited resolution of currently available spatial light modulators will dictate that the mirror 22 is made up of an array of miniature dynamic mirrors, each comprising a separate diffracting array. By arranging for the display screen 10 to have a suitably high pixel resolution, the displayed area of interest image can be built up by generating a different field of view element for each pixel, in a similar way to a dynamic lens. Alternatively, the image can be generated by modulating the emitters 24 and synchronously modifying the diffracting patterns contained in the mirror 22 in such a way that the required image is produced by switching the direction of the emitted light in the field of view. This has the advantage of requiring fewer elements in the partially transmitting panel 23 and hence allowing a higher transmission. An equivalent approach can also be used in the case where the dynamic optical element is a lens.

Figure 10:
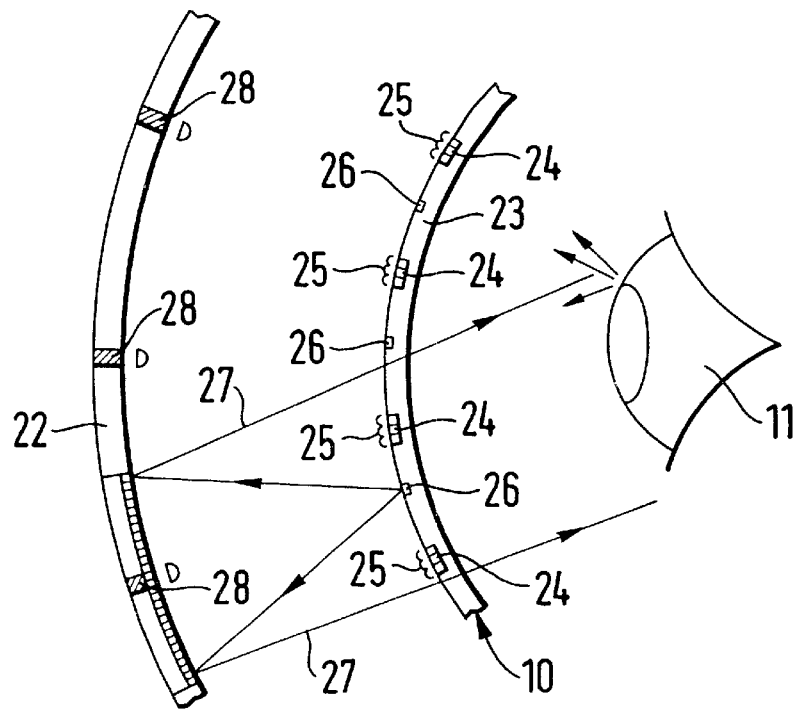
FIG. 10 is a schematic view of a modification to the second embodiment of the viewing apparatus.

FIG. 10 illustrates the application of the eye tracker to apparatus of the type shown in FIG. 9. More particularly, emitters 26 of radiation (such as infra-red light) are provided on the light transmitting screen 23 and emit radiation towards the dynamic mirror 22. The mirror 22 then reflects that radiation as a broad wash through the screen 23 and onto the observer's eye 11, as depicted by arrows 27. Radiation reflected by the eye 11 passes back through the screen 23 and onto detectors 28 provided on the mirror 22. Other configurations are, however, possible. For example, both the emitters 26 and detectors 28 could be mounted on the panel 23, with the dynamic mirror performing the functions of receiver and transmitter optics.

In the above-described embodiments, reference has been made to the spatial light modulator comprising a liquid crystal device. However, other types of spatial light modulator can also be used, such as surface acoustic wave devices and micro-mirror arrays.

Figure 11:
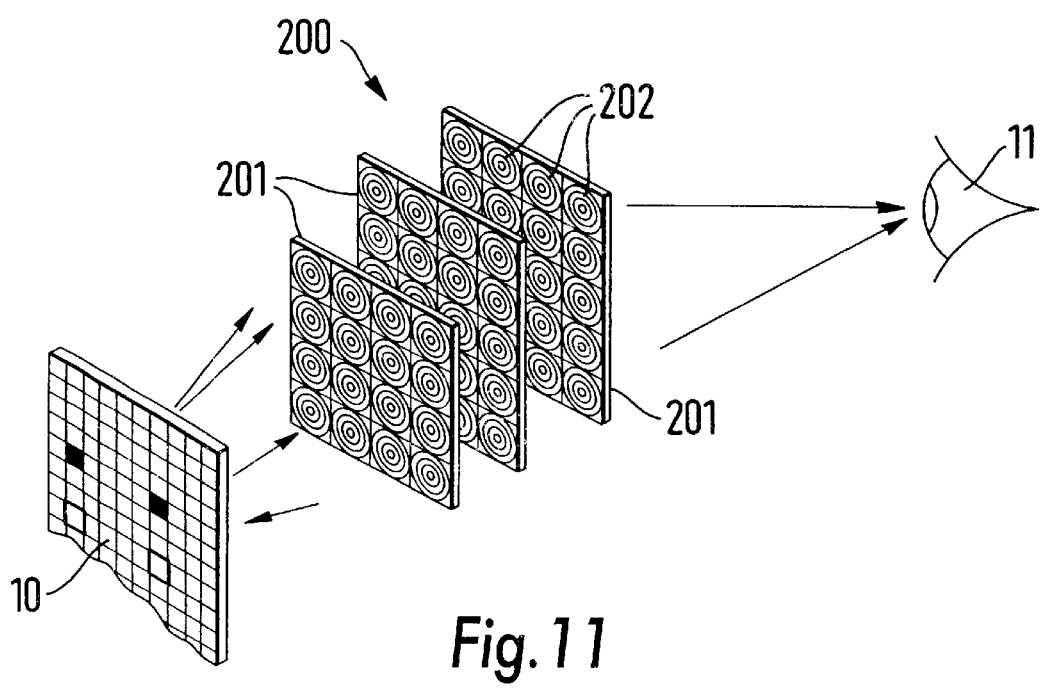
FIG. 11 illustrates a third embodiment of viewing apparatus according to the invention, which uses an electrically switchable holographic composite (ESHC)

In a further embodiment (shown in FIG. 11), the dynamic optical device 12 takes yet another form, namely that of an electrically switchable holographic composite (ESHC). Such a composite (generally referenced 200) comprises a number of layers 201, each of which contains a plurality of pre-recorded holographic elements 202 which function as diffraction gratings (or as any other chosen type of optical element). The elements 202 can be selectively switched into and out of operation by means of respective electrodes (not shown), and sequences of these elements 202 can be used to create multiple diffraction effects. ESHCs have the advantages of high resolution, high diffraction efficiency, fast switching time and the capability of implementation in non-planar geometries.

If a liquid crystal display, surface acoustic element or micromirror device is used, the dynamic optical device will operate on the basis of discrete switchable elements or pixels. Although such a device can be programmed at pixel level, this is achieved at the expense of limited resolution. As a result, it is difficult to achieve very high diffraction efficiencies. In contrast, ESHCs have sub-micron resolution, which represents a substantially higher pixel density than that of the above-described types of spatial light modulators. Typically, the resolution of conventional spatial light modulators are of the order of $512^2$, representing about one million bits of encoded data: the diffraction efficiencies tend to be well below 50%. In contrast, ESHCs offer a resolution equivalent to $10^{13}$ bits, and diffraction efficiencies close to 100% are therefore a practical proposition.

An ESHC may be defined as a holographic or diffractive photo polymeric film that has been combined with a liquid crystal. The liquid crystal is preferably suffused into the pores of the film, but can alternatively be deposited as a layer on the film. The hologram may be recorded in the liquid crystal either prior to or after the combination with the photo polymeric film. Recordal of the hologram can be performed by optical means, or by the use of highly accurate laser writing devices or optical replication techniques. The resultant composite typically comprises an array of separate holograms that are addressed by means of an array of transparent electrodes manufactured for example from indium tin oxide, which usually have a transmission of greater than 80%.

The thickness of the composite is typically 10 microns or less. Application of electric fields normal to the plane of the composite causes the optical characteristics of the liquid crystals to be changed such that the diffraction efficiency is modulated. For example, in one implementation the liquid crystal is initially aligned perpendicularly to the fringe pattern and, as the electric field is increased, the alignment swings into the direction with the effective refractive index changing accordingly. The diffraction efficiency can be either switched or tuned continuously. Typically, the range of diffraction efficiencies covers the approximate range of 100% to 0.1%. There is therefore a very large range of diffraction efficiency between the "fully on" and "fully off" states of the ESHC, which makes the ESHC a very efficient switching device.

The speed of response is high due to the encapsulation of the liquid crystals in the micropore structure of the polymeric film. In fact, it is possible to achieve hologram switching times in the region of 1 to 10 microseconds using nematic liquid crystals. Ultimately, very high resolutions can be achieved, with equivalent array dimensions of up to $10^5$ and sub-micron spot sizes. It is even possible to approach the theoretical ideal of a continuous kinoform.

Although the holographic diffraction patterns must be pre-recorded and cannot be altered, a limited degree of programmability is possible. For example, it is possible to programme diffraction efficiency and relative phase in arrays of holographic elements arranged in stacks and/or adjacent to each other. A multi-layer ESHC of this type is essentially a programmable volume hologram. Taking multiple diffraction into account, a wavefront passing through the device could be switched into $2^N$ output wavefronts, where the integer N represents the product of the number of layers and the number of elements in each layer. As an illustration of the capability of such a device, in the case of a three-level system with each plane having a resolution of 8×8 elements, the number of possible output wavefronts is $2^{197}$ (or $10^{57}$). Hence, the number of diffractive functions that can be implemented is practically unlimited. In practice, some of the layers in a stack would be provided with electrodes, whilst others would operate in a passive state.

Each wavefront can be made to correspond to a particular gaze direction. Manifestly, not all of the wavefronts would be generated at the same time because of the need for certain rays to use the same holograms along portions of their paths. However, by making the hologram array sizes suitably large and taking advantage of the characteristic short switching time, the requisite number of wavefronts can be generated at typical video rates of 50 Hz.

For example, to provide one minute of arc display resolution over an instantaneous eye track area of interest of size 10°×10°, a total of 600×600 separate wavefronts would need to be generated in 1/50 second, which is equivalent to $18×10^6$ separate wavefronts in 20 milliseconds. Assuming that the input resolution of the portion of the hologram array stack that corresponds to the field of view is 30×30, and the entire holographic array can be switched in 1 microsecond, then the time required to generate the full set of wavefronts is equal to:

$$1×(18×10^6)/(30×30)=20 \text{ milliseconds}.$$

To provide the same resolution and switching time over the maximum human monocular field of view of 150°×135°, a holographic array would be required with size equivalent to:

$$[(150/10)×30]×[(135/10)×30]=450×390.$$

By using a construction of the above-described type, it is also possible to arrange for all of the holographic elements in a layer to be switched simultaneously, with the selection of specific holograms in the layers being performed by appropriate switching of the individual light-emitting elements. Such "optical addressing" eliminates the wiring problems posed by having several high resolution hologram matrices. Furthermore, by recording multiple Bragg patterns in a given hologram, the number of possible deviation patterns for a light beam passing through that hologram can be increased, thereby enabling the number of layers in the ESHC to be reduced. The number of Bragg patterns that can be multiplexed depends on the refractive index modulation that is available, typically up to around 20 multiplexed patterns are possible. This reduces the effects of scatter and stray light, whilst stray light can be further minimised by the use of anti-reflection coatings applied to selected layers.

Because holograms are highly dispersive, the effects of chromatic aberration can be minimised by arranging for separate "channels" in the ESHC for the primary wavelengths, so that each channel can be optimised for the particular wavelength concerned. The term "channel" is intended to indicate a sequence of holographic elements through which the beam propagates. Also, chromatic aberration caused by the finite bandwidth of the light emitted by LEDs, can be reduced by employing suitable band pass filters An ESHC is typically a thick or volume hologram which is based on Bragg diffraction, giving a theoretical diffraction efficiency of 100%. In principle, it is also possible to configure the ESHC as thin holograms (Raman-Nath regime), which can also give 100% efficiency in certain circumstances.

Figure 11A:
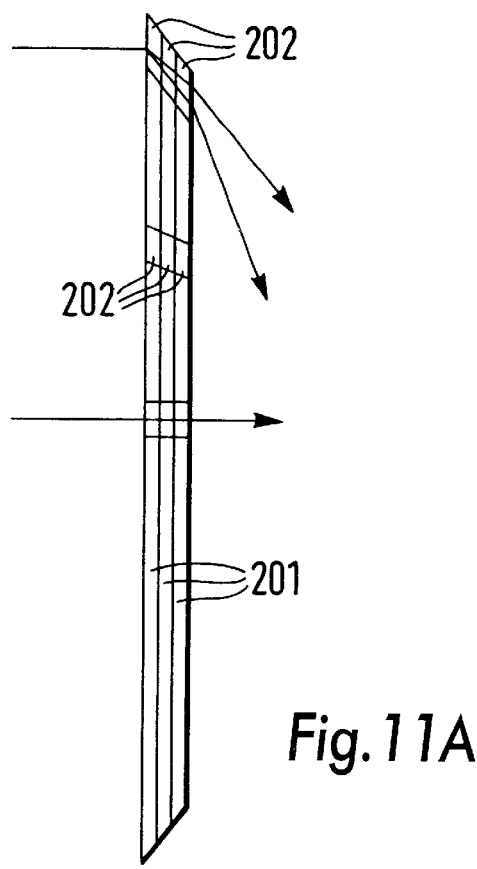
FIGS. 11A and 11B illustrate the operation of the ESHC.

FIG. 11A depicts an ESHC in which the holographic elements 202 in successive layers 201 become progressively more staggered towards the periphery. This enables light rays (such as indicated at L) to be deviated at the periphery of the ESHC through larger angles than would otherwise be possible.

Figure 11B:
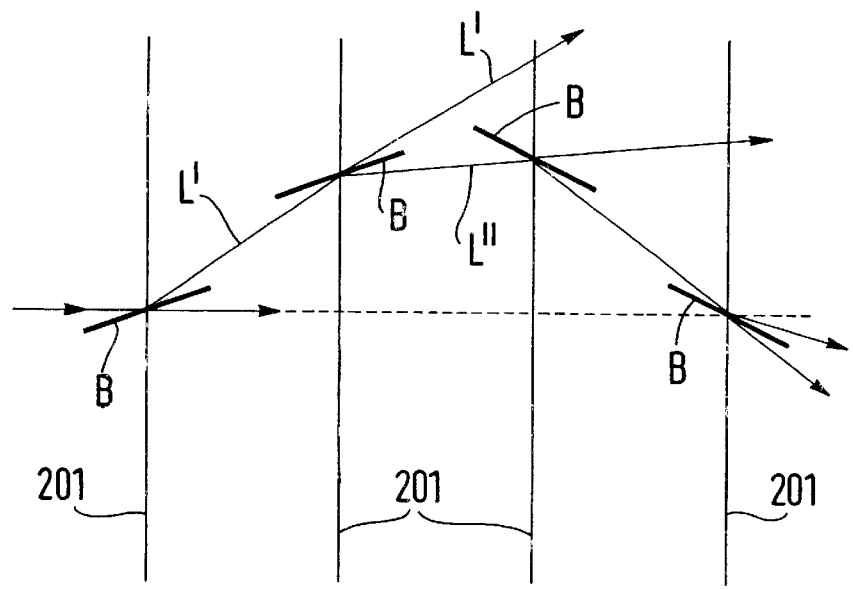

FIG. 11B is a schematic illustration of the way in which a light beam $L^1$ can be deflected through differing angles by reflection at the Bragg surfaces B of the holographic elements in successive layers 201 of the ESHC. For example, $L^1$ denotes the path followed by a light beam which is deflected by a Bragg surface in the first of the layers 201 only, whilst $L^1$ denotes the path followed by the same beam when the relevant holographic element in the next layer is activated so that the beam is deflected by a Bragg surface in that element also.

In a further development, the dynamic optical device can operates a mirror, for example by combining an ESHC device with conventional silicon backplane technology, such as is used in active matrix liquid crystal displays.

As a further alternative, the dynamic optical device can take the form of a multi-layer liquid crystal divided into a number of individual cells, each of which is switchable between a limited number of states, which creates essentially the same effect as an ESHC.

Figure 12:
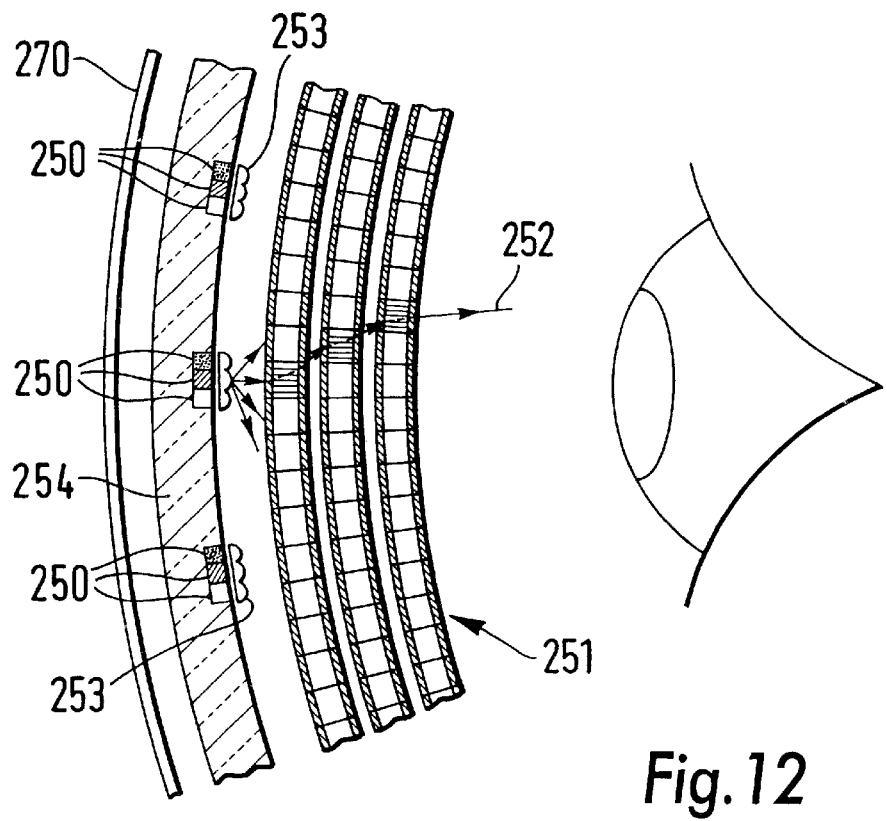
FIGS. 12 and 13 illustrate the use of an alternative form of image generator in the apparatus.

In the above-described embodiments, the image for viewing by the observer is generated by a display screen, in particular an LCD screen, although an electro luminescent screen or any other flat-panel screen (eg LED array) could be used instead. However, it is also possible to use other types of image generator. FIG. 12 shows one particular example, in which the input image data is generated by modulating an array of light emitting elements 250 (such as lasers or LEDs) at high frequency and using an ESHC 251 as described above to "switch" the laser beams between different orientations, such as indicated for laser beam 252. The lasers in the array can be configured as triads of red, blue and green. A micro-optic beam-forming system such as micro lenses 253 can be associated with the lasers.

Figure 13:
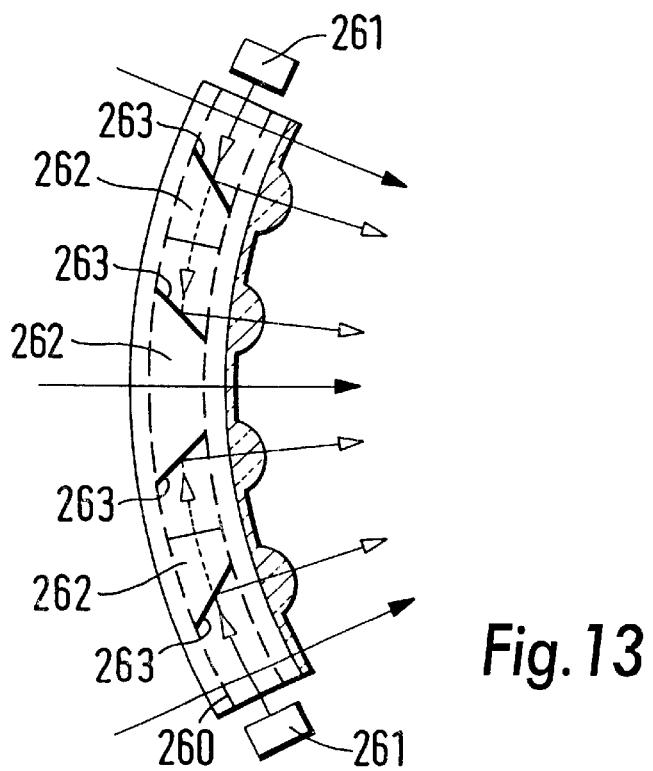

FIG. 13 shows another example of the viewing apparatus, in which the image generator takes the form of a light guide panel 260 having a series of lasers 261 disposed around its periphery. Fabricated within the panel 260 are a series of prisms 262 each of which has an inclined semi-reflecting surface 263 confronting one of the lasers 261. These surfaces 263 receive light from the lasers 261 and partially reflect this in a direction normal to the panel 260. Micro-lenses 264 are provided on a surface of the panel 260 which confronts the user, to focus and/or shape the respective laser beams.

As an alternative to lasers, LEDs of suitably narrow wavelength bands could be used. The lasers and/or LEDs can be fabricated from wide-band semiconductors such as GaN.

The image information is encoded by temporal modulation of the laser beams, and therefore the resolution of the laser array does not need to be large. This means that, by providing the laser array on a generally transparent panel, the observer can have the facility of viewing the surroundings. Furthermore, as shown in FIG. 12, it is possible to provide an external shutter 270 (such as by means of an additional layer of liquid crystal) whereby the observer can switch the surroundings into and out of view. In this manner, the observer can use the shutter to shut out external light whilst using the ESHC in diffractive mode to view a virtual display, or alternatively the shutter can be used to transmit light from the surroundings whilst switching the ESHC to non-diffractive mode. As a further alternative, the virtual imagery and ambient view can be superimposed in the manner of a head-up display. Under these circumstances, in order to avoid conflict with using the same processing elements in the ESHC for both virtual and ambient image scanning, the shutter liquid crystal can be provided as an array such that it is possible to switch off those pixels corresponding to field of view directions at which virtual imagery is to be displayed. Alternatively, other techniques can be employed, such as those based on polarisation, wavelength division, etc.

Figure 14:
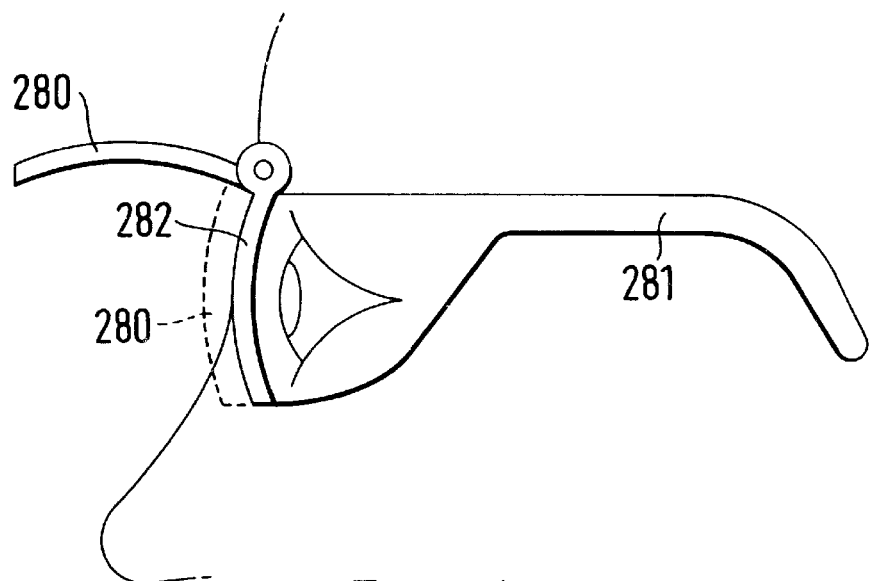
FIGS. 14 and 15 show arrangements enabling the viewing of the surroundings in addition to a displayed image.

There are other ways in which a provision for viewing the surroundings can be included in the apparatus. For example, in the case where the image generator comprises an LCD or electro luminescent panel, gaps can be left in the display layer. Also, in the case where an LCD is used, a transparent back-lighting arrangement can be used. A further alternative is depicted in FIG. 14, wherein the display panel (referenced 280) is pivotally mounted on a headset 281 of which the apparatus forms part. The panel 280 can be pivoted between a first position (shown in broken lines) in which it confronts the dynamic lens (referenced 282), and a second position (shown in solid lines) in which it is disposed away from the lens 282 to allow ambient light to pass therethrough.

Figure 15:
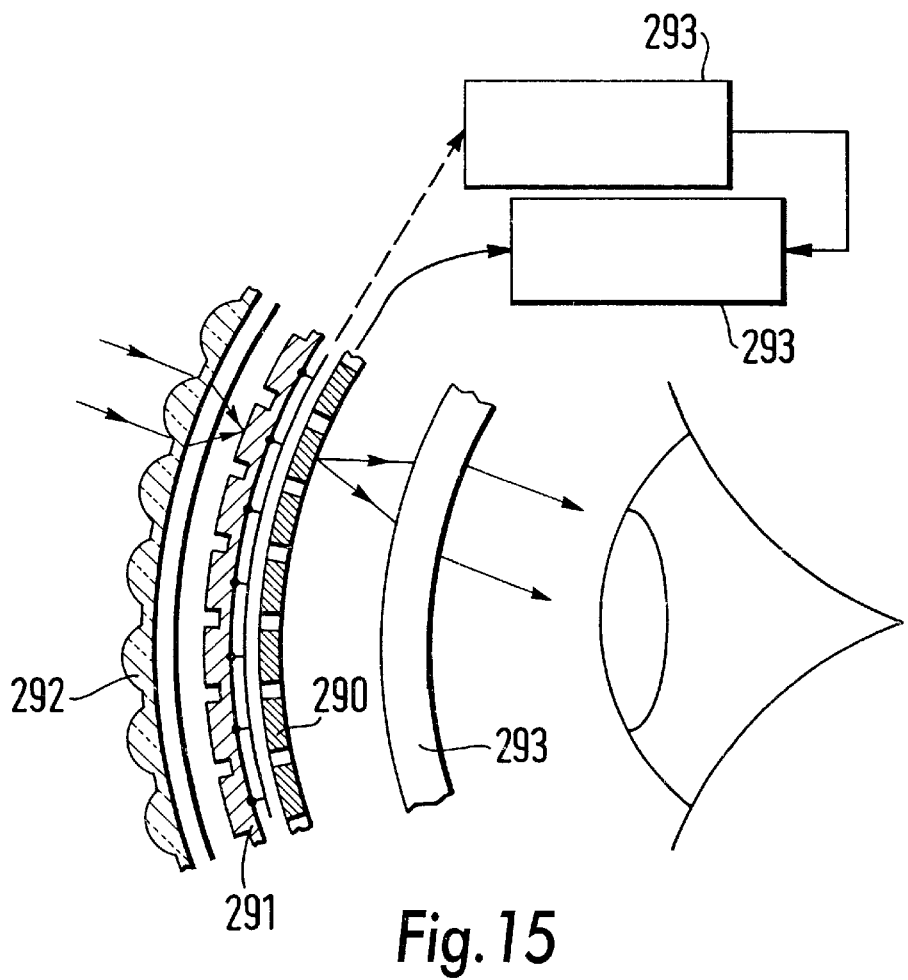

Another arrangement is shown in FIG. 15, wherein the display panel (referenced 290) does not allow ambient light to pass therethrough, and in which a detector array 291 is disposed on the external side of the panel 290 so that the detectors therein face the surroundings through a panel 292 of lenses. The lenses in the panel 292 form images of the surroundings on the detectors in the array 291, and signals received from the detectors are processed by a processor 293 for display on the display panel 290. In this way, the user can switch the display on the panel 292 between internal imagery and the surroundings, and view either of these by way of the dynamic lens (referenced 293).

In the above-described embodiments, the sensing means comprises emitters and detectors. The emitters emit radiation (such as infra-red radiation) which is projected as a broad wash onto the observer's eye, and the radiation scattered back from the eye is projected onto the detectors. On the one hand, the dynamic optical device functions not only to focus image light onto the observer's eye, but also to project the radiation from the emitters onto the eye and/or to project the radiation reflected by the eye to the detectors. On the other hand, the emitters and/or the detectors are provided at pixel level within the field of view of the observed image.

These general arrangements can be applied to viewing apparatuses other than those incorporating dynamic optical devices.

Figure 16:
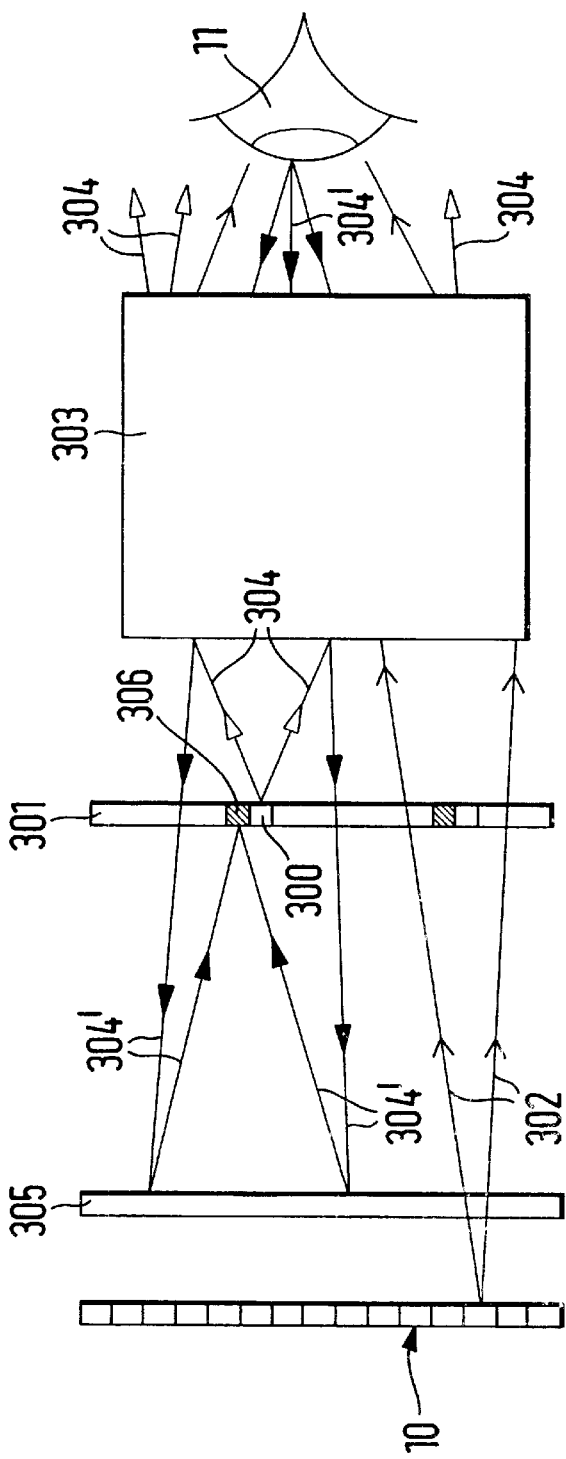
FIGS. 16 to 18 are schematic views of further embodiments of viewing apparatus according to the invention, showing in particular an eye tracker.
Figure 16A:
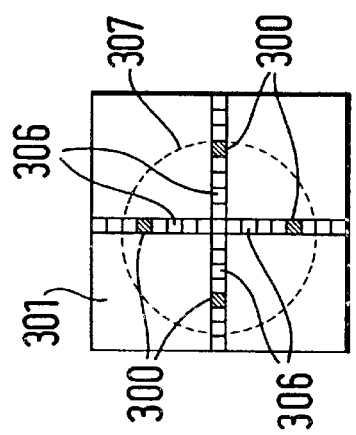

One such system is illustrated in FIGS. 16 and 16A, in which one or more infra-red emitters (referenced 300) are provided on a light-transmitting screen 301 positioned forwardly of the display screen 10. Image light 302 from the display screen 10 is directed to the observer's eye 11 by means of a lens system 303 (depicted schematically) which collimates the image light over a field of view of typically 40°. Infra-red radiation 304 from the emitter(s) 300 is projected as a broad wash onto the surface of the eye 11 by the lens system 303 and is scattered thereby. The returned infra-red radiation 304[1] is propagated back through the lens system 303, and is projected onto an element 305 positioned immediately in front of the display screen 10 which acts as a reflector to infra-red wavelengths but not to visible light. The element 305 can for example be a holographic or diffractive mirror, or a conventional dichroic mirror. After reflection by the element 305, the infra-red radiation is projected onto the screen 301 as a focussed image of the pupil of the eye 11, and is incident upon one or more detectors 306 provided at pixel level in or on the screen 301. The arrangement of the emitters 300 and detectors 306 is such as to cause minimal obstruction to the passage of the image light through the screen 301.

FIG. 16A shows a cross-section of the screen 301, on which the focussed pupil image is indicated by broken lines at 307. If (as shown) the detectors 306 are arranged in an array in the shape of a cross, then the dimensions of the instantaneous image 307 can be measured in two orthogonal directions, although other arrangements are also possible.

Figure 17:
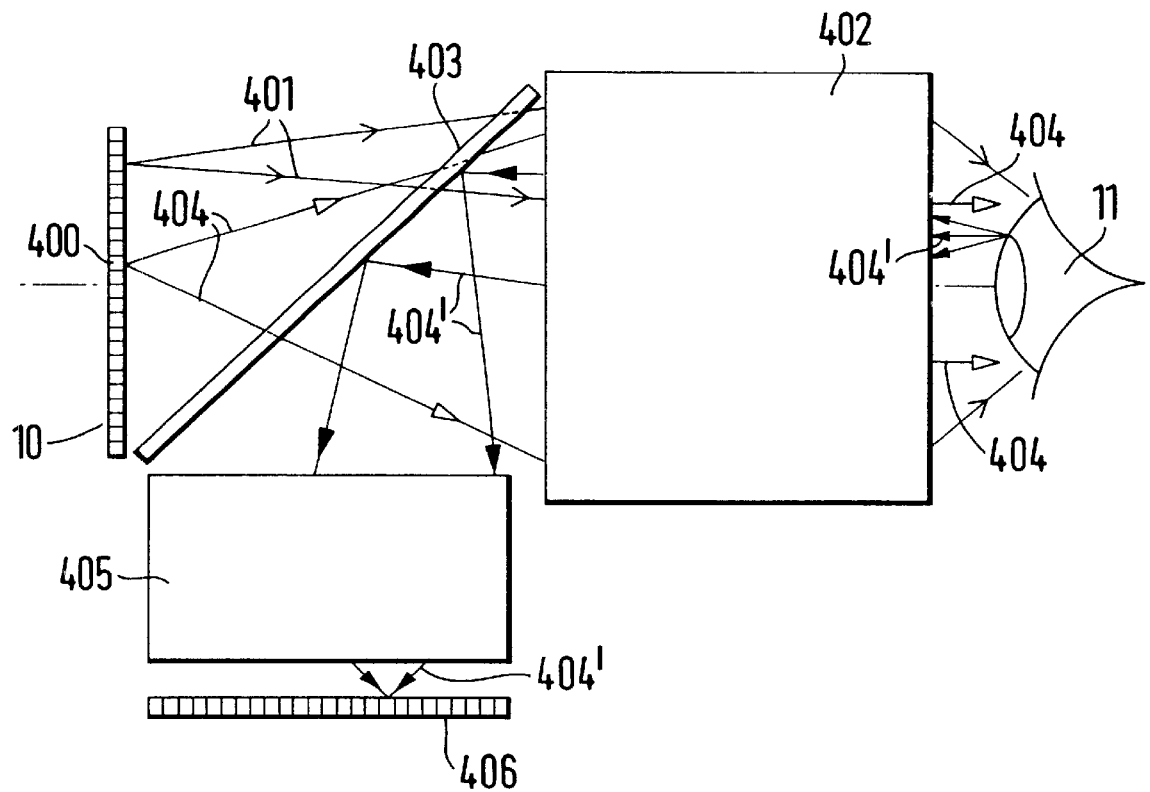

An alternative system is shown in FIG. 17, wherein a small number of infra-red emitters 400 (only one shown) are provided at pixel level in or on the display screen 10 itself. As in the embodiment of FIG. 16, image light 401 from the display screen 10 is directed to the observer's eye 11 by a lens system 402. In this embodiment, however, an inclined beamsplitter 403 is interposed between the display screen 10 and the lens system 402. Infra-red radiation 404 from the emitters 400 passes through the beamsplitter 403 and is projected by the lens system 402 as a broad wash onto the observer's eye 11 to be scattered thereby. The returned infra-red radiation 404[1] passes through the lens system 402 and is then reflected by the beamsplitter 403 so that it is deflected laterally (either sideways or up or down) towards a relay lens system 405, which projects the returned infra-red radiation onto an array of detectors 406 to form a focussed infra-red image of the pupil on the detector array. Both the relay lens system 405 and the detector array 406 are thus displaced laterally from the main optical path through the viewing apparatus. In the illustrated embodiment, the beamsplitter 403 takes the form of a coated light-transmitting plate, but a prism can be used instead.

Figure 18:
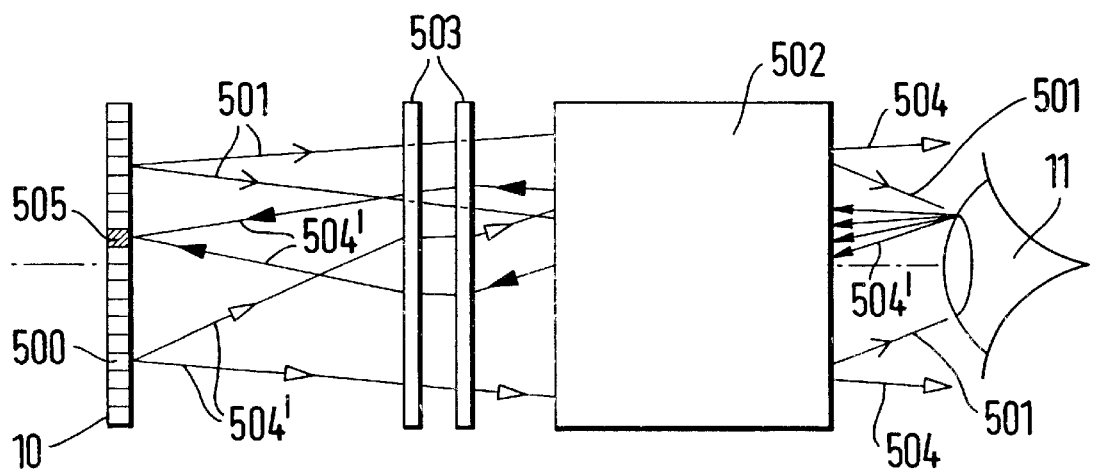

A further alternative arrangement is shown in FIG. 18, wherein one or more infra-red emitters 500 are again incorporated at pixel level in or on the display screen 10. As before, image light 501 from the display screen 10 is focussed by a lens system 502 onto the observer's eye 11, with the lens system 502 collimating the visible light over a field of view of typically 40°. However, in this embodiment there is positioned between the display screen 10 and the lens system 502 one or more diffractive or holographic elements 503 which are optimised for infra-red wavelengths and which have minimal effect on the visible light from the display screen 10. Thus, the focal length of the combined optical system comprising the element(s) 503 and the lens system 502 for visible light is different from that for infra-red radiation. The combined effect of the element(s) 503 and the lens system 502 is to produce a broad wash of infra-red radiation across the surface of the observer's eye 11. Infra-red light scattered off the surface of the eye is then projected by the combined effect of the lens system 502 and the element(s) 503 onto the surface of the display screen 10 to form a focussed infra-red image of the pupil, which is detected by detectors 505 (only one shown) also provided at pixel level in or on the display screen 10.

In the embodiments of FIGS. 16 to 18, the lens systems 303, 402 and 502 are based on conventional refractive optical elements. However, the principles described can be applied to arrangements wherein a dynamic optical device is used instead.

Also in the embodiments of FIGS. 16 to 18, the lens systems 303, 402 and 502 perform the dual function of focussing the image light onto the observer's eye and of focussing the returned infrared radiation onto the detectors. The lens system must therefore cope with a wide variation of different wavelengths, and a lens system which has optimised performance with respect to visible light may not perform exactly the desired function with respect to infra-red radiation. In practice, the disparity is sufficiently small that it does not create a problem, particularly if near infra-red radiation is used. However, it is nevertheless sometimes desirable to incorporate some form of compensation for the infra-red radiation, such as the incorporation of the element (s) 503 in the embodiment of FIG. 18.

In an alternative arrangement, instead of employing infra-red radiation for eye tracking, it is possible to use light in the visible spectrum. This visible light could be rendered undetectable to the observer by using the light in very short bursts, or by allocating specific elements in the array for tracking (which could be colour-adjusted to match the surrounding image elements), or by using specific narrow bands of wavelengths.

The efficiency of the eye tracker will be limited by the latency of the processing system used to detect the variation in the ocular feature (such as the pupil edge, the dark pupil, etc) that is being used. In order to increase this efficiency, it is possible to use parallel processing techniques which can be implemented using hybrid electronic-optical technology, or even entirely optical processing methods. By harnessing the full speed advantage of optical computing, it is possible to perform eye tracking such that the image generator only needs to compute the data contained within the central 1° to 2° of the eye's field of view.

An optical computer for use with the present apparatus comprises components such as switches, data stores and communication links. The processing involves the interaction of the dynamic lens with the emitters and detectors. Many different optical processing architectures are possible, the most appropriate types being those based on adaptive networks in which the processing functions are replicated at each node. It is even possible to combine the image generator, optical computing structure and the dynamic lens into a single monolithic structure.

As explained above, a dynamic lens is a device based on diffraction principles whose optical form can be changed electronically. For example, this can take the form of a lens based on a binary profile, or a close approximation to the ideal kinoform, written onto a spatial light modulator or similar device. Although the primary use of the dynamic lens is to vary the focal length, it can also serve other functions such as to correct geometric distortions and aberrations. For example, chromatic aberrations can be reduced by re-calculating the diffraction pattern profiles (and hence the focal length) of the lens for each primary wavelength in sequence. Alternatively, three associated dynamic lenses could be used, each optimised for a different primary wavelength. These lenses can be augmented by bandpass filters operating at the primary wavelengths. In addition, the dynamic lens (in association with an input image array) can be used to vary the position, size and/or shape of the exit pupil in real time.

As a result of this, it is possible to achieve several advantageous effects. Firstly, a wide field of view (FOV) can be created, which helps realism. This stems primarily from the ability to move the exit pupil. The ability to implement imaging functions within a relatively thin architecture also helps to eliminate many of the geometrical optical obstacles to achieving high FOV displays. In contrast, in conventional optics a large exit pupil is achieved either by using mechanical means to move a small exit pupil (which is generally not practical given the problems of inertia, etc), or by using large numbers of optical elements to correct aberrations, etc, with consequent complexity and expense.

Secondly, the apparatus can be made light in weight so that it is comfortable and safe for a user to wear. This also means that the apparatus has low inertia, so the user has minimal difficulty in moving his or her head while wearing the apparatus. The reduction in weight results in part from the intrinsic lightness of the materials used to fabricate the spatial light modulator, as compared with those employed for conventional optics.

Thirdly, the functions of image transmission and eye tracking are combined into a single integral unit. This also assists in making the apparatus relatively low in weight. Furthermore, it also provides for easy area of interest detection and detail enrichment, which enables an effective high resolution to be achieved.

Fourthly, by suitably designing the software for driving operation of the dynamic lens, it is possible to prevent disassociation between accommodation and convergence, so that the apparatus does not place a visual strain on the user and provides a more realistic display. This is to be contrasted with conventional optics which, even if the relevant range information is available, are not capable of displaying objects at the correct depth without incorporating moving parts in the optical system or using other methods of changing the focal characteristics of the lenses.

A further advantageous property of the dynamic lens is its ability to reconfigure itself to allow different wavelength bands (e.g. visible and infra-red) to propagate through it. Multiple wavelengths can be transmitted simultaneously, either by allocating different portions of the dynamic lens to different wavelengths, or by reconfiguring the lens sequentially for those wavelengths. Moreover, the direction of propagation of those different wavelengths does not have to be the same. This makes the dynamic lens particularly useful in on the one hand transmitting image light for viewing by the observer, and on the other hand transmitting the infrared light used in the eye tracker system.

Although the above description makes particular reference to dynamic lenses, it will be appreciated that the principles expounded are equally applicable to dynamic mirrors.

Figure 19:
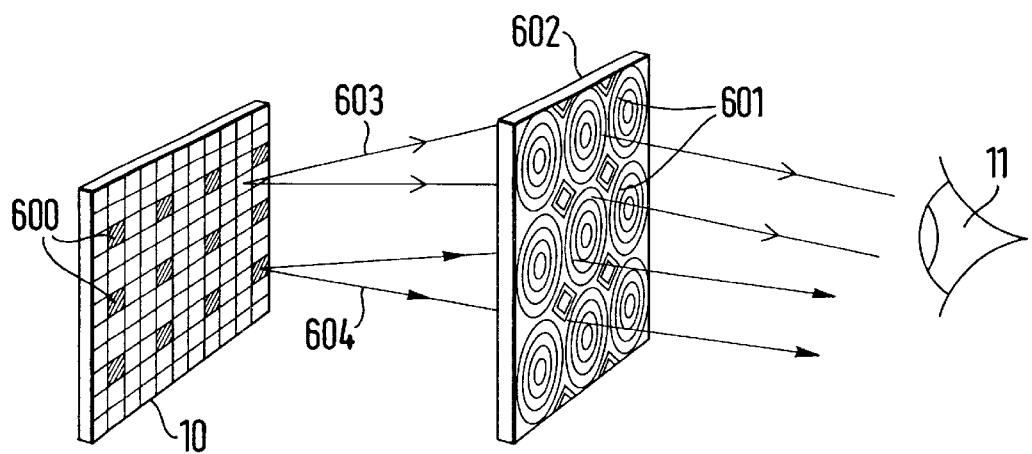
FIG. 19 is a diagram illustrating the general principle of a dynamic optical device as embodied in the viewing apparatus.

FIG. 19 illustrates the basic concept of a dynamic lens operating on diffraction principles. The display screen 10 embodies a number of infra-red emitters 600 at pixel level, and a series of diffraction patterns 601 are generated in a spatial light modulator 602 which serve the function of lenses, to focus image light 603 from the display screen 10 onto the observer's eye and to project the infra-red light 604 from the emitters 600 as a broad wash onto the surface of the eye 11.

In order to reduce the burden on the dynamic lens and facilitate the diffraction calculations that are required in order to re-configure the spatial light modulator each time the display is updated, it is possible to transform or distort the image as actually displayed on the display screen 10. Under these circumstances, the distinction between the input image display and the dynamic optical device becomes less well defined.

Figure 20:
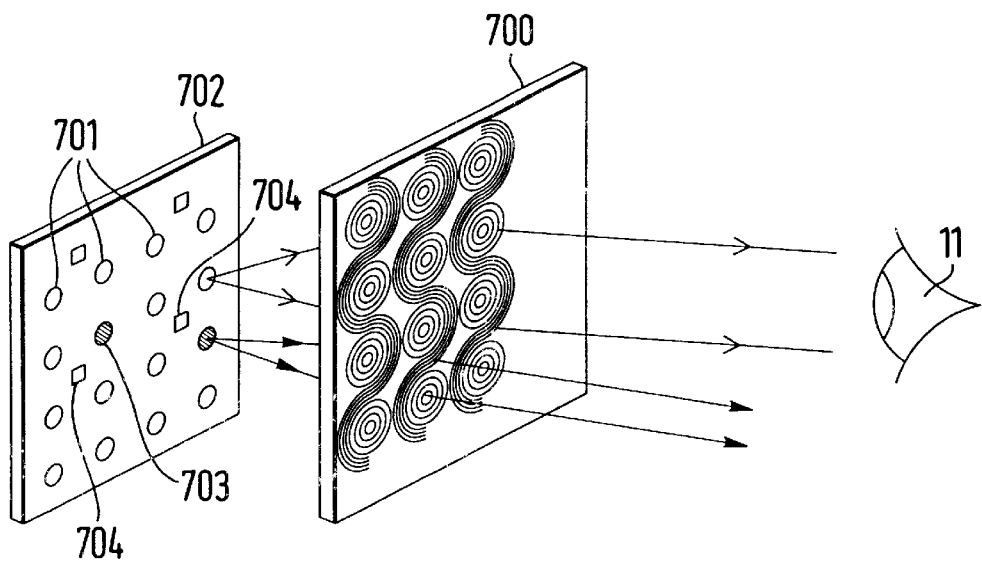
FIG. 20 is a diagram illustrating the use of a dynamic hologram.

FIG. 20 illustrates a further development of the invention, in which the functions of image generation and dynamic imaging are combined within a dynamic holographic element 700. The required output image is then produced by reconstruction using only a series of reference beams produced by an array of discrete light sources 701. In the illustrated arrangement, the light sources 701 are mounted on a screen 702 disposed behind the dynamic holographic element 700, on which are also provided infra-red emitters 703 and detectors 704 for the eye tracking function.

The screen 702 thus performs no imaging function, i.e. it has no pictorial content, its purpose being merely to provide a set of reference beams. The resolution of the array of reference beam sources 701 can in fact be quite low, although the economy of design that results is achieved at the expense of the additional computational power required to re-calculate the hologram for each image update, since both the lens function and the image need to be recomputed.

The dynamic holographic element 700 can be implemented using a high resolution spatial light modulator such as that based on liquid crystals, micro-mechanical mirror arrays or opto-acoustic devices. It is possible for the dynamic hologram to operate either in transmission or in reflection. As is the case where a separate dynamic optical device and image generator are used, the use of reflective techniques can offer certain advantages, such as in allowing circuitry to be implemented in a more efficient way, and in enhancing the brightness of the display.

It is also possible to incorporate into the dynamic hologram lenses which project infra-red light from the emitters 703 onto the observer's eye, these lenses being encoded within portions of the hologram.

In a further modification (not shown), a texturised screen is provided around the periphery of the image displayed on the display screen. For reasons that are not yet fully understood, it has been found that the use of such a texturised screen can induce an illusion of depth in the displayed image, and this effect can be used to enhance the reality of the image as perceived by the user. The screen can be provided as a separate component which surrounds or partially overlies the periphery of the display screen. Alternatively, a peripheral region of the display screen itself can be reserved to display an image replicating the texturised effect. Moreover, under these circumstances it is possible to alter the display in that peripheral region to vary the texturised effect in real time, to allow for changes in the image proper as displayed on the screen and adjust the "pseudo-depth" effect in accordance with those changes.

In the above embodiments, the display screen and dynamic lens are described as being curved. However, as depicted in FIGS. 21 and 21A, it is possible to construct the display screen 10 from a series of planar panels 900, and similarly to construct the dynamic lens 12 from a series of panels 901, each panel 900 and 901 being angled relative to its neighbour(s) so that the display screen and dynamic lens each approximate to a curve. FIG. 21A shows the configuration of the screen 10 and lens 12 in three dimensions.

Figure 23:
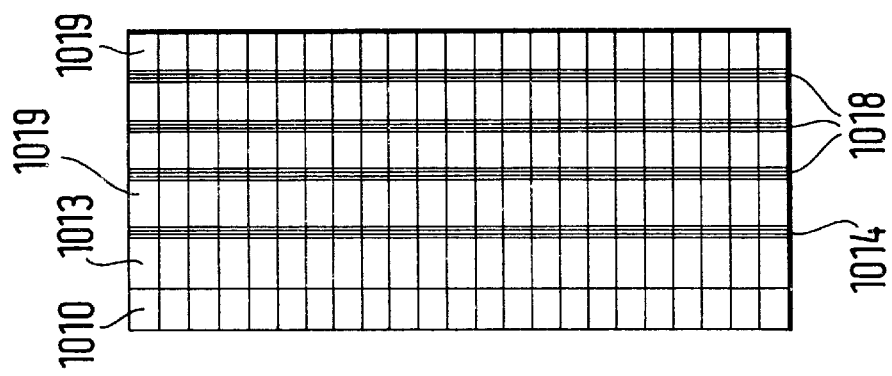
FIG. 23 is a schematic section through the apparatus shown in FIG. 22.

Referring now to FIGS. 22 and 23, there is shown apparatus for viewing an image which is generally similar to that depicted in FIG. 12. The apparatus comprises an image generator 1010 in the form of an array of LED triads 0101 provided on a generally light-transmitting screen 1012. The LED triads 1011 form a low resolution matrix of, say, 100×100 or 200×200 elements. Light from the LED triads 1011 is subjected to beam shaping by a microlens array 1013, and then passes through a liquid crystal shutter 1014 towards an ESHC 1015. The microlens array 1013 has as its main effect the collimation of the light emitted by the LED triads 1011, and can be of holographic design.

The LEDs in the triads 1011 are driven by signals defining an image to be viewed by an observer. On the one hand, these signals are such that the array of LEDs produces a relatively coarse version of the final image. On the other hand, the signals supplied to each LED triad are time-modulated with information referring to image detail, and the ESHC 1015 functions to scan the light from that triad in a manner which causes the image detail to be perceived by the observer.

The apparatus also comprises an eye tracker device which senses the direction of gaze of the observer's eye. Suitable forms of eye tracker are described above and are not shown in any detail herein. Suffice it to say that radiation from a plurality of emitters is projected onto the observer's eye in a broad wash, and radiation reflected back from the eye is projected onto detectors, such as detector elements 16 mounted in or on the screen 1012. The same optics as employed for image transmission are also used for the purpose of projecting the radiation onto the eye and/or projecting the reflected radiation onto the detector elements 1016.

As indicated above, the eye tracker senses the direction of gaze of the observer's eye. The operation of the ESHC 1015 is then controlled in accordance therewith, so that the ESHC functions to "expand" the resolution of the initially coarse image only in the direction in which the eye is looking. In all other areas of the image, the resolution is maintained at the initial coarse level. As the direction of gaze alters, the operation of the ESHC is changed as appropriate to "expand" the resolution in the new direction of gaze instead.

The liquid crystal shutter 1014 is switchable between two states, in the first of which the shutter is generally light-obstructing but contains windows 1017 for transmission of the light from the respective LED triads 1011. Within these windows, the liquid crystal material can control the phase of the light beams, for example to create fine-tuning of the collimation of those beams. In its second state, the shutter 1014 is generally light-transmitting and allows viewing of the ambient surroundings through the screen 1012, either separately from or in conjunction with viewing of the image from the LEDs.

The ESHC 1015 can include passive holograms (i.e. not electrically switched) that are written onto the substrates, to allow for greater flexibility in optimising the optical performance of the apparatus.

Instead of LEDs, the image generator 1010 can employ lasers.

As can be seen to advantage in FIG. 23, this form of construction enables a very compact monolithic arrangement to be achieved, comprising a succession of layers as follows:

the screen 1012 containing the LED/laser array
the microlens array 1013 embodied within a spacer
the liquid crystal shutter 1014
the ESHC 1015 comprising successive layers of holographic material 1018 plus electrodes, and spacers 1019 between these layers.

The first spacer 1019 in the ESHC (i.e. that directly adjacent to the liquid crystal shutter 1014) allows for development of the light beams from the LED triads after passing through the microlens array 1013 and before passing through the ESHC proper.

It is anticipated that the overall thickness of the apparatus can be made no greater than about 7.5 mm, enabling the apparatus to be incorporated into something akin to a pair of spectacles.

Figure 24:
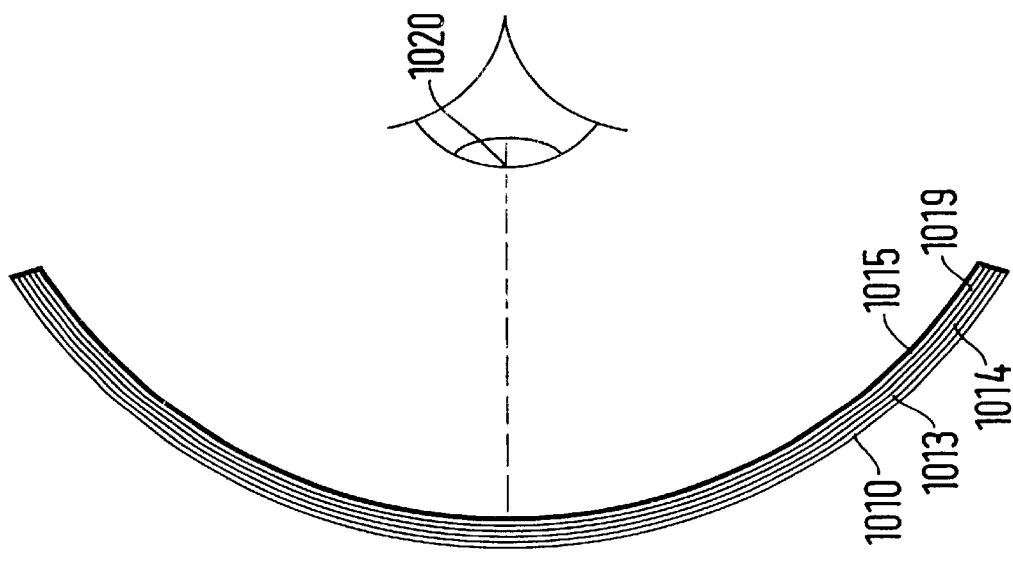
FIG. 24 is a schematic sectional view of an arrangement wherein the apparatus is of generally curved configuration.

FIG. 24 shows a modified arrangement wherein the apparatus is of generally curved configuration, the curve being centred generally on a nominal eye point 1020. Typically, the radius curvature of the apparatus is about 25 mm.

Figure 25:
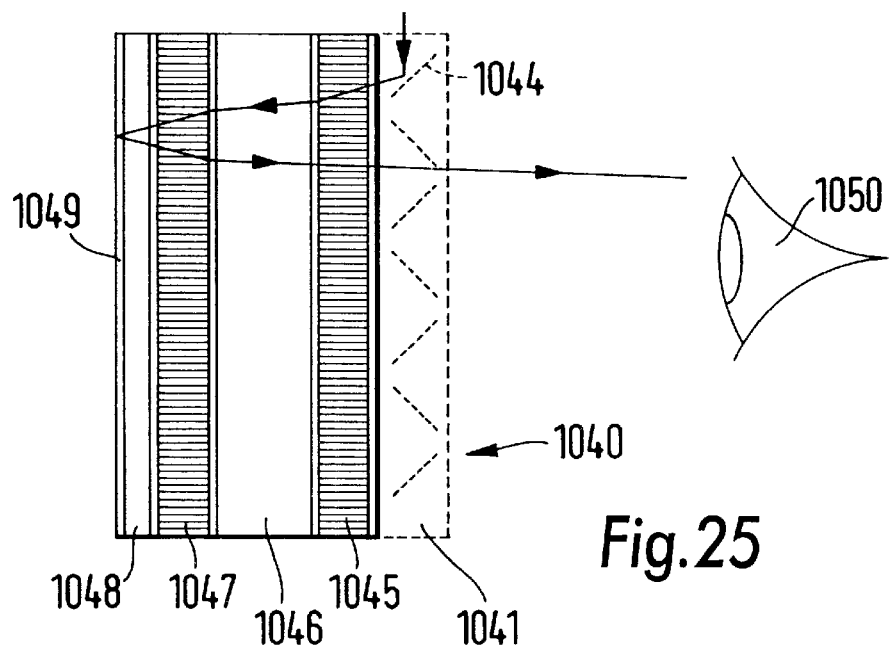
FIG. 25 is a schematic sectional view of another embodiment of the apparatus.

FIG. 25 shows an alternative arrangement, which operates on reflective principles. In this embodiment, the image generator 1040 comprises a light guide 1041 disposed on a side of the apparatus adjacent to the observer's eye. The light guide 1041 is depicted in detail (in curved configuration) in FIG. 26, and has a series of LEDs or lasers 1042 disposed around its periphery. Lens elements 1043 (only one shown) are formed on the periphery of the light guide 1041, and each serves to collimate the light from a respective one of the LEDs/lasers 1042 to form a beam which is projected along the guide 1041 through the body thereof. Disposed at intervals within the guide 1041 are prismatic surfaces 1044 (which can be coated with suitably reflective materials), which serve to deflect the light beams laterally out of the light guide 1041.

Disposed behind the light guide 1041 (as viewed by the observer) are, in order, a first ESHC 1045, a light-transmitting spacer 1046, a second ESHC 1047, a further light-transmitting spacer 1048, and a reflector 1049 (which is preferably partially reflecting). Light emerging from the light guide 1041 is acted on in succession by the ESHCs 1045 and 1047, is reflected by the reflector 1049, passes back through the ESHCs 1047 and 1045 and finally through the light guide 1041 to the observer's eye 1050. Because the light undertakes two passes through each of the ESHCs 1045 and 1047, this gives more opportunity for control of the beam propagation.

In practice, the apparatus shown in FIG. 25 can also include a microlens array and a liquid crystal shutter such as those described above with reference to FIGS. 22 and 23, but these have been omitted for convenience of illustration.

Figures 27A, 27B, 27C:
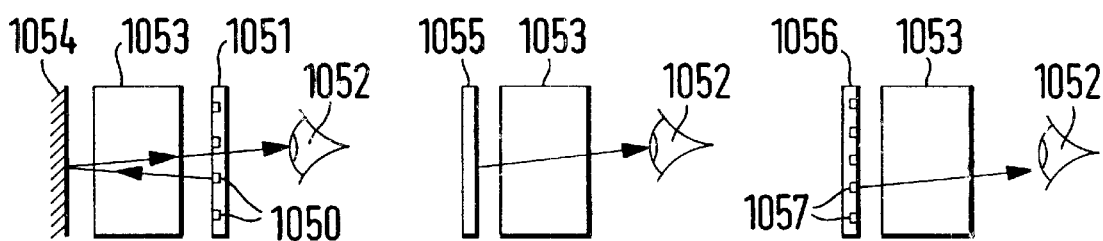
FIGS. 27A, 27B and 27C are schematic views of different optical arrangements for the apparatus.

FIGS. 27A to 27C show in schematic form alternative configurations for the apparatus. In FIG. 27A, the image generator comprises an array of LEDs or lasers 1050 provided in or on a light transmitting screen 1051. As with the arrangement depicted in FIG. 25, the screen 1051 is disposed on a side of the apparatus adjacent to the observer's eye 1052. Light from the LEDs/lasers 1050 is initially projected away from the eye 1052 through an ESHC 1053, and is then reflected by a reflector 1054 back through the ESHC 1053. The light then passes through the screen 1051 and passes to the observer's eye. Again, this arrangement has the advantage that the light passes through the ESHC 1053 twice, giving increased opportunity for the control of the light beam shaping.

Figure 26:
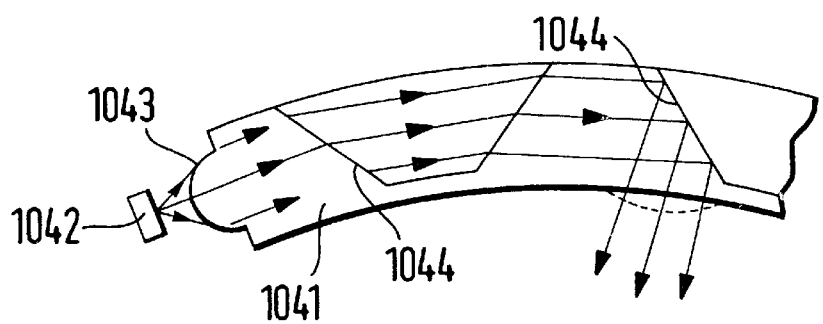
FIG. 26 is a schematic sectional view of part of an image generator.

FIG. 27B shows in schematic terms an arrangement similar to that already described with reference to FIGS. 22 and 23, but wherein the image generator comprises a light guide 1055 of the general type shown in FIG. 26. FIG. 27C shows a similar arrangement, but wherein the light guide is replaced by a light-transmitting screen 1056 having an array of LEDs or lasers 1057 therein or thereon.

As with FIG. 25, the microlens array and the liquid crystal shutter have been omitted from the drawings for ease of illustration, but will in practice be provided between the image generator and the ESHC in each case.

All of these arrangements are capable of being implemented as a monolithic, very thin panel (typically less than 10 mm in thickness). In practice, the overall thickness of the panel will be dictated by the required thickness of the substrates and spacers.

The use of a light guide such as described with reference to FIGS. 25, 26 and 27B can offer a greater degree of transparency to the image generator for viewing of the ambient surroundings.

Figure 28:
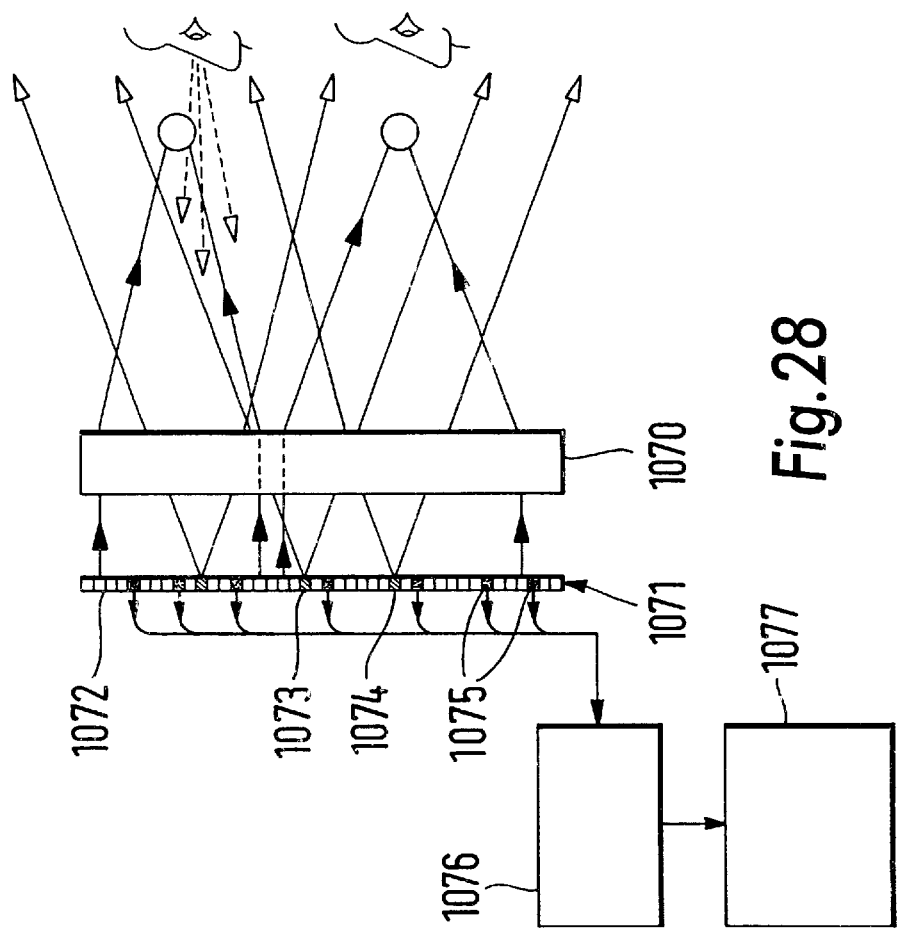
FIG. 28 is a schematic view of apparatus for use by multiple observers.

As depicted in FIG. 28, the apparatus can also be adapted for use by multiple observers, by arranging for the dynamic optical device (referenced 1070) to create more than one exit pupil, one for each of the intended observers. Reference numeral 1071 denotes an image generator comprising an array of LEDs/lasers 1072 on a screen 1073, which screen also incorporates emitters 1074 and detectors 1075 of the eye tracking system. Signals received from the detectors 1075 are processed by a processor 1076 and a multiple-target tracking system 1077 which detects the positions of the heads of the various observers. The characteristics of the dynamic optical device 1070 are then altered in accordance with the detected head positions and directions of gaze, to create suitable exit pupils for viewing by the observers of the image transmitted by the image generator 1071.

Figure 29:
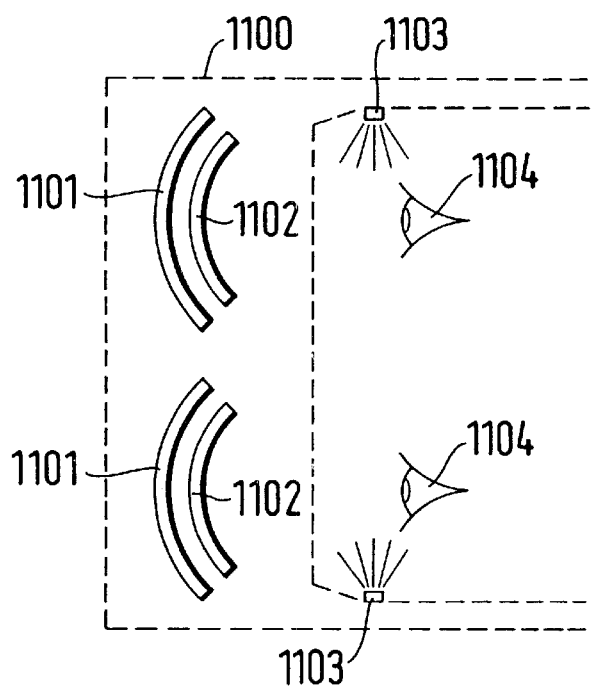
FIGS. 29 and 30 are schematic plan views of apparatuses for use in displaying stereoscopic images.

The apparatus can also be adapted for the viewing of stereoscopic images. For example, as shown in FIG. 29, a pair of apparatuses as described can be mounted side by side in a headset 1100. Each apparatus comprises generally an image generator 1101 (such as a display screen), a dynamic optical device 1102 and an eye tracker 1103. Stereoscopically paired images are produced by the image generators 1101, and are viewed by the observer's eyes 1104 respectively by means of the respective dynamic optical devices 1102. Each eye tracker 1103 senses the direction of gaze of the respective eye 1104, and the respective dynamic optical device 1102 maintains an area of high resolution in that direction of gaze, and alters this as the direction of gaze changes.

Figure 30:
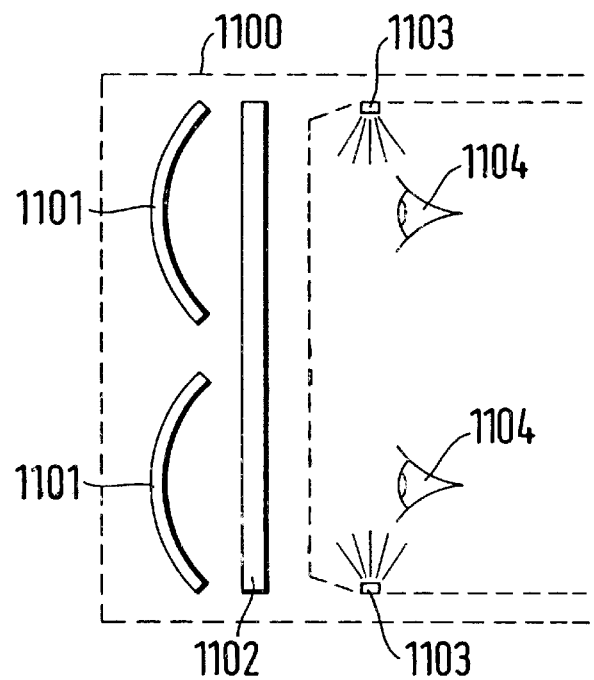

In an alternative arrangement (shown in FIG. 30), a single dynamic optical device 1102[1] is used in common to both apparatuses, and acts to create two areas of high resolution corresponding to the directions of gaze of the observer's eyes 1104, respectively. Under these circumstances, it may be possible to employ a single eye tracker 1103 which detects the direction of gaze of one eye 1104. One area of high resolution is created using signals obtained directly from the eye tracker, while the other area of high resolution is created in accordance with signals received from the eye tracker 1103 and information in the image input signal.

Figure 31:
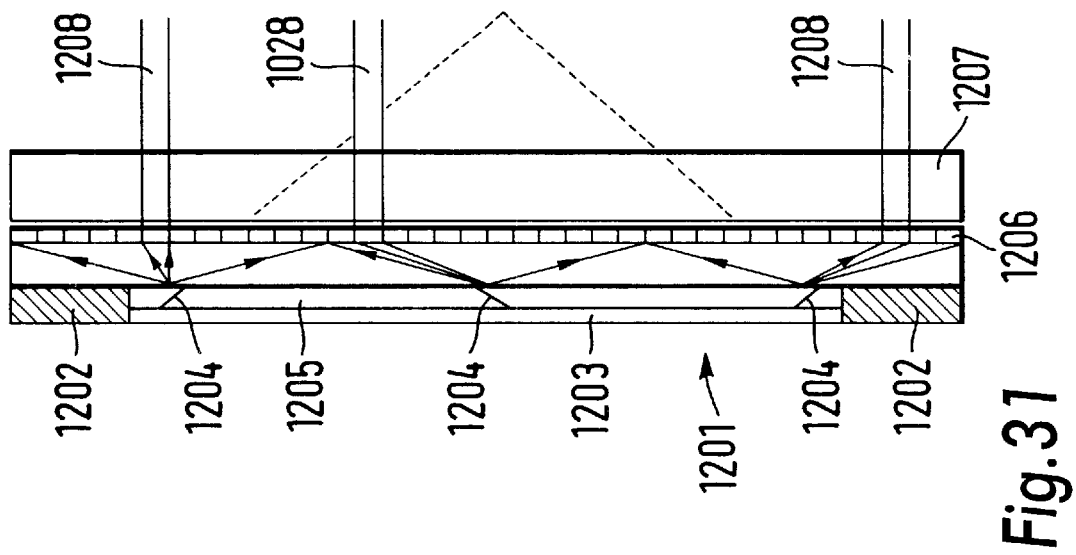
FIGS. 31 to 35 show a further embodiment of viewing apparatus according to the present invention, and FIGS. 36. 36A and 36B show a modification of the embodiment depicted in FIGS. 31 to 35.

FIG. 31 shows a further embodiment of the invention in which the display screen (referenced 1201) is of a different form. In, for example, the embodiment of FIG. 12 the display screen comprises a monolithic LED array on a substrate. The size of this array is equivalent to a 768×768 matrix on a 60 mm substrate and, whilst this is not a particularly large matrix in purely numerical terms, the need to cluster the LEDs in a small area can pose difficulties due to the high density of wiring required. Also, the presence of this wiring on the substrate will have the effect of reducing the intensity of the light passing therethrough when the apparatus is used in a mode to view the surroundings.

The arrangement depicted in FIG. 31 is intended to solve this particular difficulty by employing photon generation modules 1202 which are disposed around the periphery of a transparent plate 1203. Each module 1202 is built up from a number of separate, lower resolution arrays of LEDs, as will be described later. The plate 1203 is moulded from plastics material and includes light guides 1204 and miniature lenses (not shown in FIG. 31) which are used to relay demagnified images of the LED arrays to each of a number of nodes 1205 situated directly in front of the microlens array (referenced 1206). Reference numeral 1207 designates the ESHC, while reference numerals 1208 indicate typical output light beams produced by the apparatus.

Figure 32:
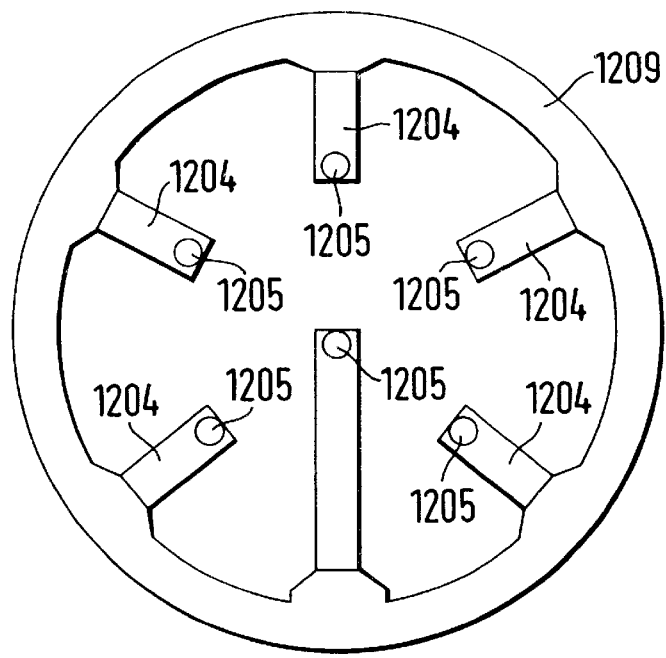

FIG. 32 shows a front view of the display screen 1201, wherein the positioning of light guides 1204 and nodes 1205 (six in all) can be seen to advantage. Reference numeral 1209 designates an opaque region in which the photon generation modules 1202 are located.

Mounting the photon generation modules 1202 around the periphery of the plate 1203 also solves the problem of decreasing geometric blur due to the finite size of the LED elements, since the ratio of pixel size to LED/microlens array distance must be kept small. Furthermore, the plate 1203 does not now have to be made of a suitable LED substrate material, and can simply be made of optical-grade plastics.

Figure 33:
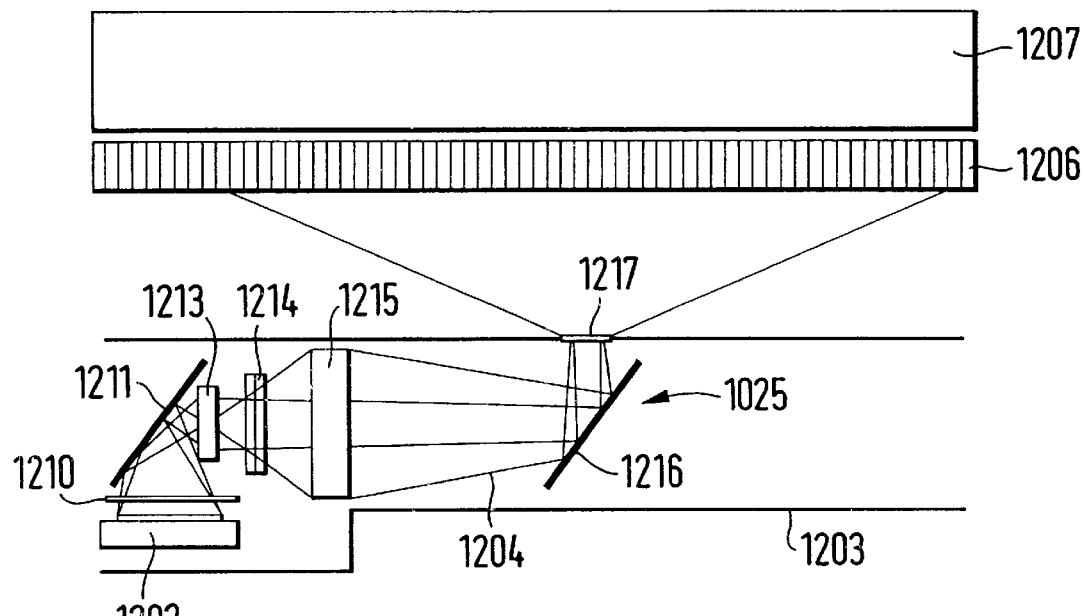

FIG. 33 shows the construction and operation of one LED array of a photon generation module 1202 in detail. More particularly, the LED array is disposed parallel to the plate 1203, and light emitted therefrom is subjected to initial beam shaping by an optical element 1210 such as a holographic diffuser The light is then reflected through 90° inwardly of the plate 1203 by a reflector element 1211, and passes in sequence through a relay lens 1213, a focussing element 1214 (for example an LCD element) and a condenser lens 1215. The light then passes along the respective light guide 1204 to the respective node 1205, where it is deflected by a reflector element 1216 towards the microlens array 1206. On leaving the plate 1203, the light is spread by a beam diverging element 1217 provided on the surface of the plate 1203 confronting the microlens array 1206.

Figure 34:
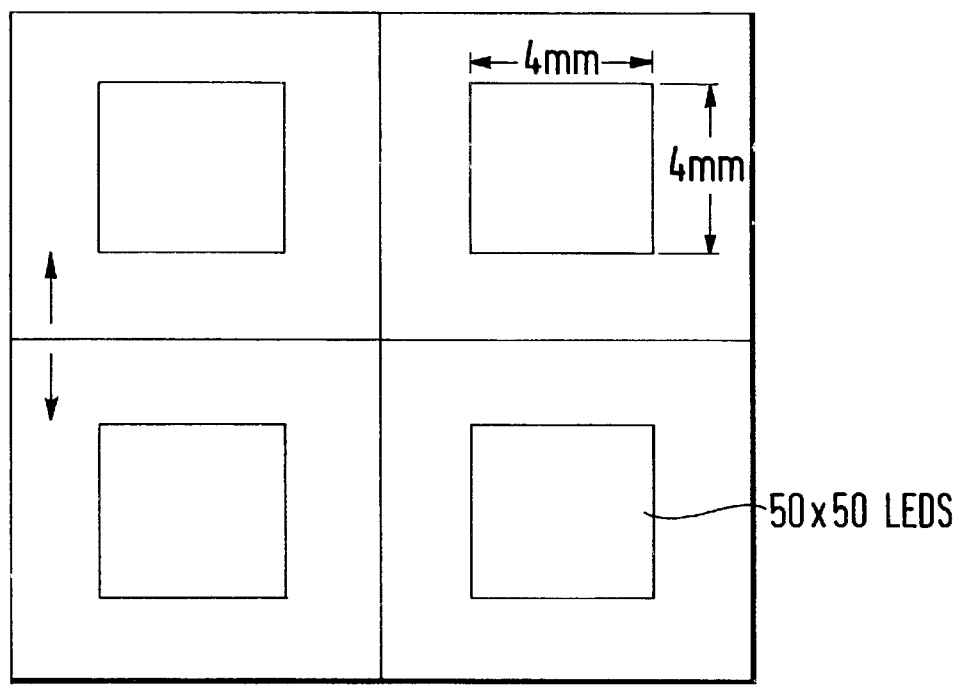

As indicated above, each of the photon generation modules 1202 is formed of a cluster of LED arrays. A typical example is shown in FIG. 34, wherein the module comprises four arrays 1221 each containing a 50×50 matrix of LEDs measuring 4 mm×4 mm. Because each of the arrays 1221 subtends a slightly different angle to the associated optics, the beams generated by the four arrays emerge at slightly different angles from the respective node 1205. This can be used to achieve a small amount of variation in the direction of the output beam for each channel of light passage through the assembly of the microlens array 1206 and the ESHC 1207.

Figure 35:
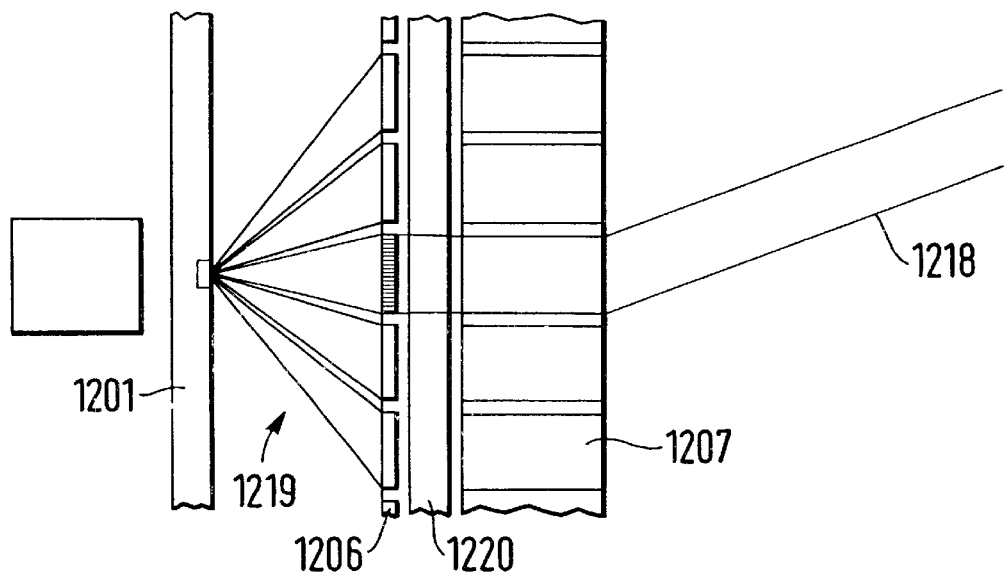

FIG. 35 is a schematic view of apparatus embodying the above-described design of display panel, illustrating the typical passage therethrough of an output beam 1218. The display panel 1201 is mounted on one side of a transparent light guide panel 1219, the panel 1219 having the array of microlenses 1206 mounted on its other side. An LCD shutter 1220 is disposed between the microlens array 1206 and the ESHC 1207. In this embodiment, the microlens array 1206 comprises a 36×36 array of independently switchable holographic microlenses, and the ESHC 1207 comprises a stack of substrates each containing a 36×36 array of simultaneously addressable holograms.

Figure 36:
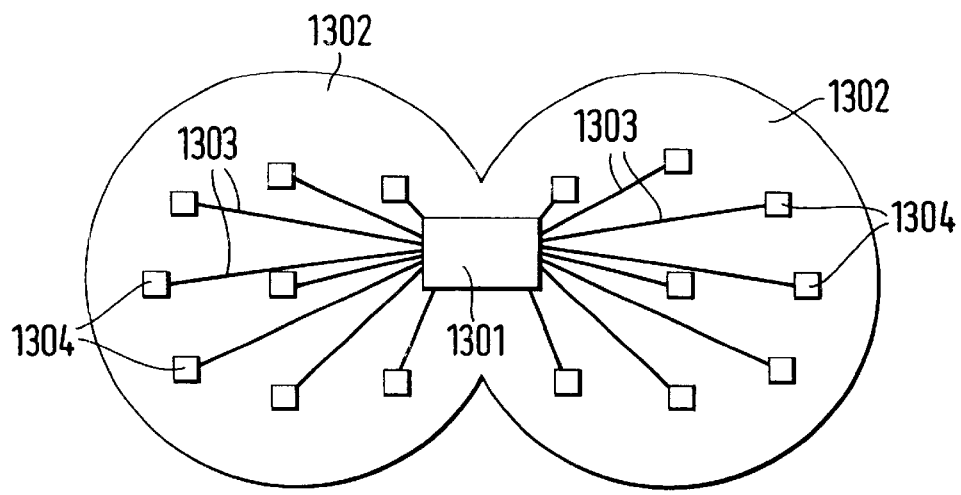
Figure 36A:
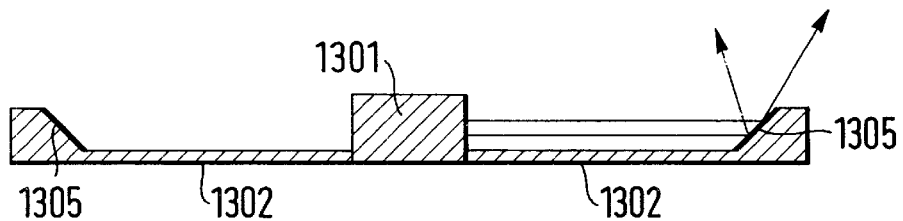

FIGS. 36 and 36A show an alternative arrangement wherein a single photon generation module (referenced 1301) is employed in common between display screens 1302 for viewing by the observer's two eyes, respectively. The module 1301 operates on essentially the same principles as that described in the embodiment of FIGS. 31 to 34, and is disposed intermediate the two display screens 1302. Each display screen 1302 includes light guides 1303 and nodes 1304 as before, the nodes 1304 in this instance being formed by curved mirrors 1305.

Figure 36B:
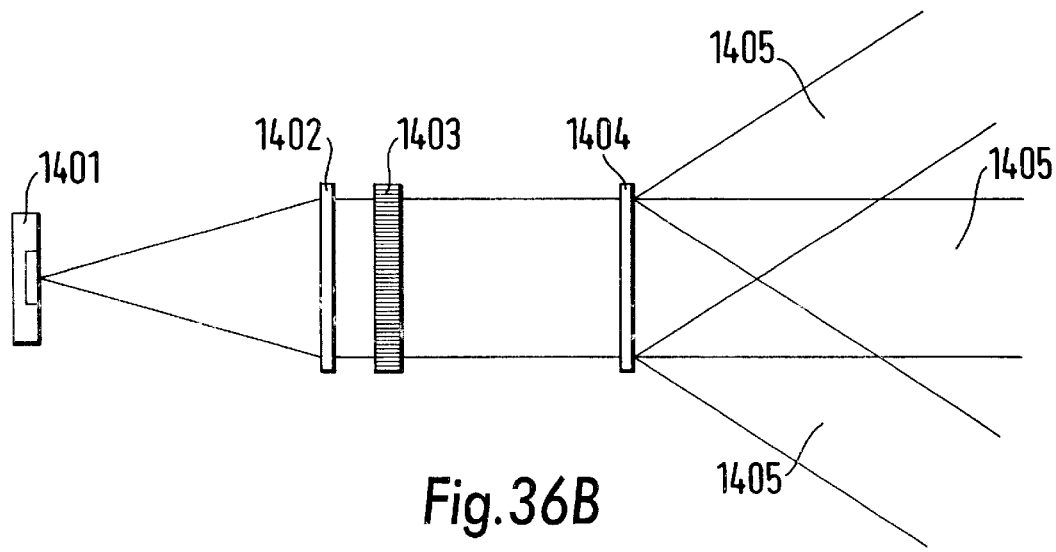

FIG. 36B shows schematically a manner in which the photon generation module can be implemented in this arrangement. More particularly light from an LED array 1401 contained in the module is subjected to beam shaping by a lens 1402 and then passes through a liquid crystal array 1403. The beam then passes to a fixed grid 1404 which operates on diffraction principles to produce a plurality of output beams 1405 at defined angles, and the above-mentioned light guides are configured to match those angles.

Figure 37:
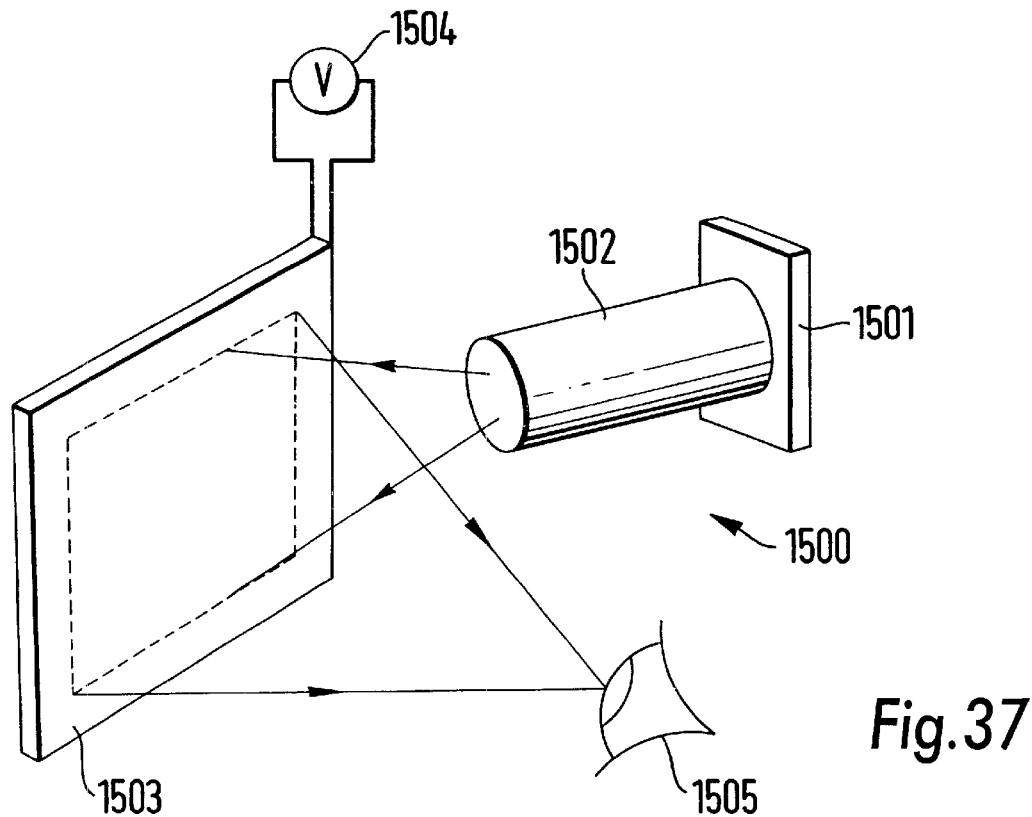
FIG. 37 is a perspective schematic diagram of a further specific embodiment of apparatus in accordance with the invention.
Figure 38:
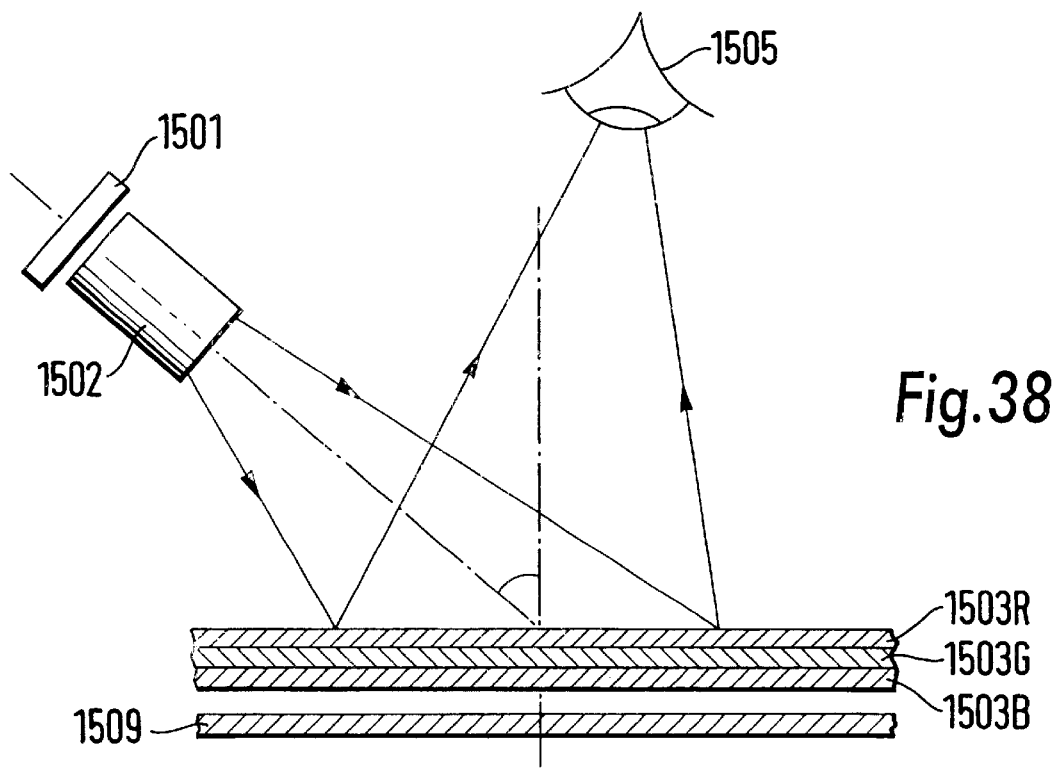
FIG. 38 is a plan view of the apparatus illustrated in FIG. 37.

Referring now to FIGS. 37 and 38 a viewing apparatus 1500 includes an image generator 1501 arranged to emit light into projection optics 1502. The projection optics 1502 are arranged to project light from the image generator towards a dynamic optical element 1503, arranged at an acute angle with a principal axis of the projection optics 1502. The dynamic optical element 1503 is generally reflective, and is controlled by a controller 1504.

The dynamic optical element 1503 causes an image to be formed such that an observer 1505 viewing the image experiences a wide field of view. For clarity, tracking apparatus is not shown on the embodiment so illustrated, but it will be appreciated that eye tracking apparatus can be arranged therein.

The off axis orientation of the arrangement is best illustrated in FIG. 38. As shown in that drawing, the dynamic optical element comprises Red, Green and Blue holographic layers 1503R, 1503G, 1503B. By enabling these layers sequentially, the element 1503 can present a full colour image to a user.

When a layer is disabled, it is transparent. It will be understood from the above description that that arrangement is necessary because of the monochromatic nature of holographic elements. The high angle of incidence of light on to the dynamic optical element 1503 from the image generator 1501 and projection optics 1502 is clearly illustrated. It will be appreciated that the Red, Green and Blue channels of the element can be interspaced in one layer as an alternative.

Located behind the dynamic optical element 1503 is an ambient light shutter 1509. The ambient light shutter 1509 is operative, on receiving a stimulus from the controller 1504 to permit or to obstruct the passage of ambient light through the dynamic optical element. The gives the user the facility to mix the display from the image generator 1501 with the real-life view beyond the viewing apparatus 1500.

Figure 39:
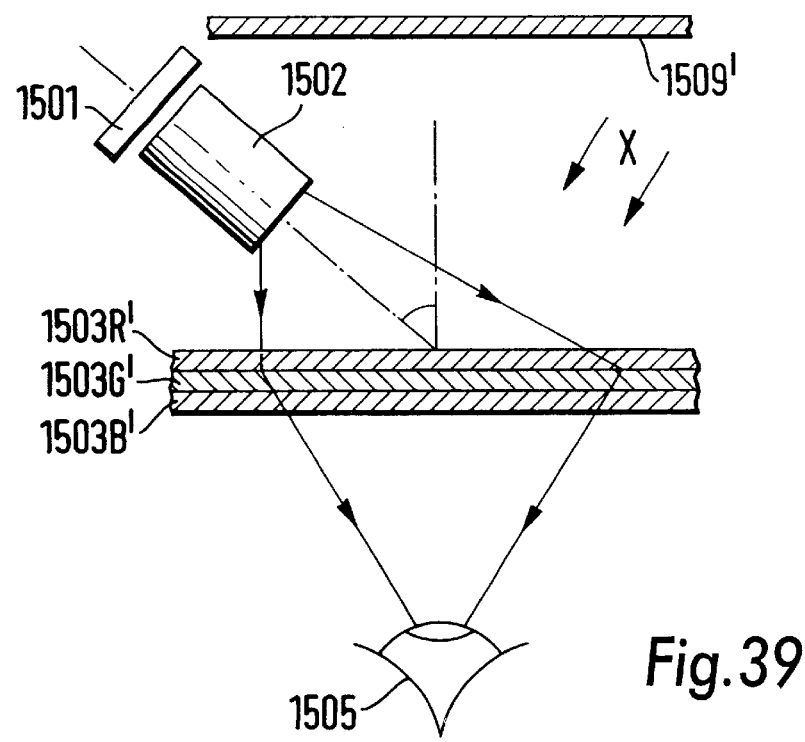
FIG. 39 is a plan view of a yet further specific embodiment of apparatus in accordance with the invention.

FIG. 39 illustrates an alternative arrangement which utilises a transmissive dynamic optical element 1503'. All other components are assigned the same reference numbers as in FIGS. 37 and 38. Evidently, the observer 1505 now views the image from the opposite side of the dynamic optical element than the image generator 1501 and projection optics 1502.

Figure 40:
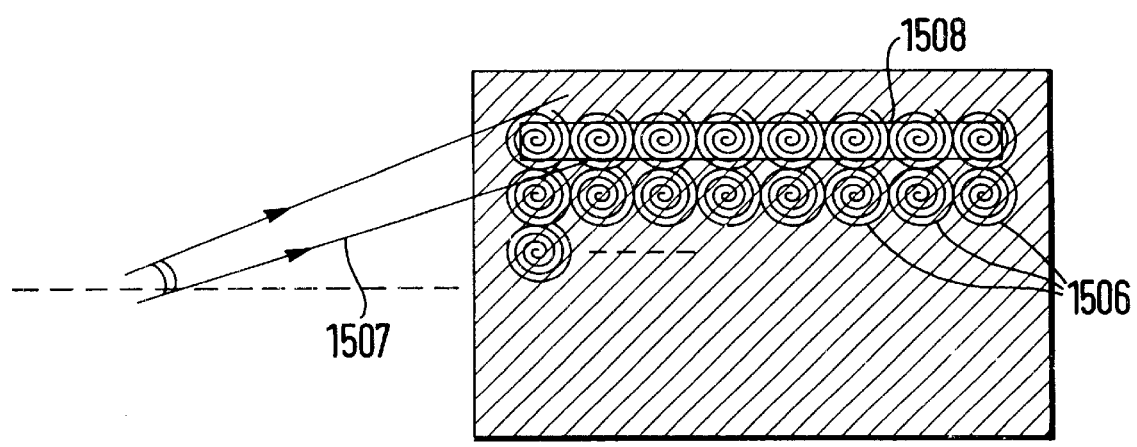
FIG. 40 is a view of the dynamic optical device of the apparatus illustrated in FIG. 39, in use, in the direction indicated by arrows X in FIG. 39.

FIG. 40 illustrates how the dynamic optical device 1503 can comprise a letterbox shutter layer. The letterbox shutter layer is omitted from FIGS. 38 and 39 for clarity. The dynamic optical device 1503 defines an array of microlenses 1506. The shutter layer is electronically controlled, such that for a given electronic signal a rectangular area or letterbox 1507 of the shutter layer becomes transparent, the remainder of the shutter layer remaining opaque. The letterbox 1507 is registered with a row of microlenses 1506. It may be registered with part of a row, or other combination of microlenses, if desired. In that way, by sequentially rendering specific areas 1507 of the shutter layer transparent, specific rows of the microlenses 1506 are exposed to light 1508 from the projection optics 1502. This reduces the possibility of accidental beam spillage over onto adjacent microlenses from those for which the beam is intended. In that way the quality of the viewed image is improved.

By virtue of the inherent angular selectivity of Bragg (volume) holograms, stray light which is predominantly parallel to the general plane of the shutter alignment, and which does not satisfy the Bragg condition will be undeflected. In this plane, the undeflected light will pass out of the field of view of the observer due to the off-axis arrangement, and thus the quality of the final viewed image can be improved.

The viewing apparata described above have many and varied applications, although they are designed primarily for use as head-mounted pieces of equipment. In a particular example, the equipment includes two such apparata, one for each eye of the user. In the entertainment field, the equipment can be used for example to display video images derived from commercially-available television broadcasts or from video recordings. In this case, the equipment can also include means for projecting the associated soundtrack (e.g. in stereo) into the user's ears.

Also, by displaying stereoscopically paired images on the two apparatuses, the equipment can be used to view 3-D television. In addition, by arranging for the projected images substantially to fill the whole of the field of view of each eye, there can be provided a low-cost system for viewing wide field films.

In the communications sector, the apparatus can be used as an autocue for persons delivering speeches or reading scripts, and can be used to display simultaneous translations to listeners in other languages. The apparatus can also be used as a wireless pager for communicating to the user.

In another area, the apparatus can be used as a night-vision aid or as an interactive magnifying device such as binoculars. Also, the apparatus can be employed in an interactive manner to display a map of the area in which the user is located to facilitate navigation and route-finding.

Further examples demonstrating the wide applicability of the apparatus include its use in computing, in training, and in providing information to an engineer e.g. for interactive maintenance of machinery. In the medical sector, the apparatus can be used as electronic glasses and to provide disability aids. The apparatus can further be utilised to provide head-up displays, for example for use by aircraft pilots and by air traffic controllers.

What is claimed is:

1. Apparatus for viewing an image, comprising:
   an image generator;
   a dynamic optical device, the dynamic optical being operative to create a modulation in respect of at least one of phase and amplitude in light of the image received thereby, said modulation being variable from one point or spatial region in the optical device to another, and;
   a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye, wherein the image generator is configured off-axis from the general direction of view of the observer's eye in use;
   wherein the apparatus is embodied in a headset with a side portion arranged to be placed in the temple region of an observer's head, the image generation generator being housed within the side portion.

2. Apparatus for viewing an image, comprising:
   an image generator;
   a dynamic optical device, the dynamic optical device being operative to create a modulation in respect to at least one of phase and amplitude in light of the image received thereby, said modulation being variable from one point or spatial region in the optical device to another, and a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;
   wherein the apparatus includes left and right image generators, left and right dynamic optical devices and left and right side portions within which said left and right image generator are housed, said left and right image generator being operative to project image light towards said left and right dynamic optical devices respectively, thereby displaying a binocular image.

3. Apparatus for viewing an image, comprising:
   an image generator;
   a dynamic optical device, the dynamic optical device being operative to create a modulation in respect of at least one of phase and amplitude in light of the image received thereby, said modulation being variable from one point or spatial region in the optical device to another, and a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

wherein the dynamic optical device acts upon image light received and transmitted there through, and the image generator is located on a side of the dynamic optical device remote from the intended position of the observer's eye.

4. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another, and a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

wherein the dynamic optical device acts upon image light received and reflected thereby, and the image generator is at least partially light-transmitting and is located between the dynamic optical device and the intended position of the observer's eye.

5. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another, and a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye; wherein the dynamic optical device functions to correct aberration and/or distortions in the image light received from the image generator.

6. Apparatus for viewing an image, comprising:

an image generator;

a dynamic optical device, the dynamic optical device being operative to create a modulation in respect to at least one of phase and amplitude in light of the image received thereby, said modulation being variable from one point or spatial region in the optical device to another;

a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

a first sensor operative to sense the direction of gaze of the observer's eye, the control circuit being operative on the dynamic optical device to create an area of relatively high resolution in said direction of gaze, the dynamic optical device providing a lesser degree of resolution of the image elsewhere, the control circuit being responsive to the first sensor and being operative to alter the characteristics of the dynamic optical device to reposition said area of relatively high resolution to include said direction of gaze as the latter is altered;

wherein the first sensor comprises a radiation emitter operative to emit radiation for projection onto the observer's eye and a detector operative to detect radiation reflected back from the eye;

wherein the radiation emitter and/or the detector are provided on a light-transmitting screen disposed between the image generator and the dynamic optical device.

7. Apparatus as claimed in claim 6, wherein the image generator is in the form of a display screen, and the radiation emitter and/or the detector are provided in or on the display screen.

8. Apparatus as claimed in claim 7, wherein the radiation emitter are provided in or on the display screen, a beam splitter device is disposed between the display screen and the dynamic optical device and is operative to deflect radiation reflected by the observer's eye laterally of a main optical path through the apparatus, and the detector are displaced laterally from the main optical path.

9. Apparatus for viewing an image comprising:

an image generator;

a dynamic optical device, the dynamic optical device being operative to create a modulation in respect of at least one of phase and amplitude in light of the image received thereby, said modulation being variable from one point or spatial region in the optical device to another;

a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

a first sensor operative to sense the direction of gas of the observer's eye, the control circuit being operative on the dynamic optical device to create an area of relatively high resolution in said direction of gaze, the dynamic optical device providing a lesser degree of resolution of the image elsewhere, the control circuit being responsive to the first sensor and being operative to alter the characteristics of the dynamic optical device to reposition said area of relatively high resolution to include said direction of gaze as the latter is altered;

wherein the first sensor comprises a radiation emitter operative to emit radiation for projection onto the observer's eye and a detector operative to detect radiation reflected back from the eye wherein the image generator produces a pixilated image, and the radiation emitter and/or detector are provided at pixel level within the field of view.

10. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another;

a control circuitry operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

a first sensor operative to sense the direction of gaze of the observer's eye, the control circuit being operative on the dynamic optical device to create an area of relatively high resolution in said direction of gaze, the dynamic optical device providing a lesser degree of resolution of the image elsewhere, the control circuitry being responsive to the first sensor and being operative to the alter the characteristics of the dynamic optical device to reposition said area of relatively high resolution to include said direction of gaze as the latter is altered;

wherein the first sensor utilizes infra-red radiation;

at least one optical element provided in tandem with the dynamic optical device, which acts upon infra-red light but not upon visible light.

11. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another;

a control circuit operative to apply a stimulus to the dynamic optical device, whereby the modulation at any point or spatial region can be varied, the control circuitry being operative to alter periodically the characteristics of the dynamic optical device so that the device acts sequentially to direct received, modulated image light of different colors to an observer's eye;

a first sensor operative to sense the direction of gaze of the observer's eye, the control circuitry being operative on the dynamic optical device to create an area of relatively high resolution in said direction of gaze, the dynamic optical device providing at lesser degree of resolution of the image elsewhere, the control circuit being responsive to the first sensor and being operative to alter the characteristics of the dynamic optical device to reposition said area of relatively high resolution to include said direction of gaze as the latter is altered;

wherein the first sensor utilizes infra-red radiation wherein the detector is provided on a light transmitting screen disposed between the image generator and the dynamic optical device.

12. Apparatus as claimed in claim 11, wherein a reflector is disposed between the image generator and the light-transmitting screen, and is operative to reflect the infra-red radiation whilst allowing transmission of visible light, such that the infra-red radiation after reflection by the observer's eye passes through the dynamic optical device and the light-transmitting screen, and is reflected by said reflector back towards the screen.

13. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another;

a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

a first sensor operative to sense the direction of gaze of the observer's eye, the control circuit being operative on the dynamic optical device to create an area of relatively high resolution in said direction of gaze, the dynamic optical device providing a lesser degree of resolution of the image elsewhere, the control circuitry being responsive to the first sensor and being operative to alter the characteristics of the dynamic optical device to reposition said area of relatively high resolution to include said direction of gaze as the latter is altered wherein the first sensor utilizes visible light;

wherein the visible light is utilized in short bursts.

14. Apparatus as claimed in claim 13, wherein the monolithic structure also includes a micro-optical device operative to perform initial beam shaping.

15. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another;

a control circuit operative to apply a stimulus to the dynamic optical device, whereby the modulation at any point or spatial region can be varied, the control circuit being operative to alter periodically the characteristics of the dynamic optical device so that the device acts sequentially to direct received, modulated image light of different colors to an observer's eye;

a first sensor operative to sense the direction of gaze of the observer's eye, the control circuit being operative on the dynamic optical device to create an area of relatively high resolution in said direction of gaze, the dynamic optical device providing a lesser degree of resolution of the image elsewhere, the control circuit being responsive to the first sensor and being operative to alter the characteristics of the dynamic optical device to reposition said area of relatively high resolution to include said direction of gaze as the latter is altered wherein the first sensor utilises visible light;

wherein the first sensor includes a light emitter means operative to emit light for projection onto the observer's eye, the image generator produces a pixilated image, the emitter is provided at a pixel level within the field of view, and the wavelength of light emitted by the light emitter is matched to that of the surrounding pixels in the generated image.

16. Apparatus for viewing an image, comprising:

an image generator;

a dynamic optical device, the dynamic optical device being operative to create a modulation in respect of at least one of phase and amplitude in light of the image received thereby, said modulation being variable from one point or spatial region in the optical device to another;

a control circuitry operative to apply a stimulus to the dynamic optical device, whereby the modulation at any point or spatial region can be varied, the control circuitry being operative to alter periodically the characteristics of the dynamic optical device so that the device acts sequentially to direct received, modulated image light of different colors to an observer's eye;

a first sensor operative to sense the direction of gaze of the observer's eye, the control circuitry being operative on the dynamic optical device to create an area of relatively high resolution in said direction of gaze, the dynamic optical device providing a lesser degree of resolution of the image elsewhere, the control circuit being responsive to the first sensor and being operative to alter the characteristics of the dynamic optical device to reposition said area of relatively high resolution to include said direction of gaze as the latter is altered wherein the first sensor utilizes visible light;

wherein the visible light is utilized in specific narrow band of wavelengths.

* * * * *